United States Patent
Lee et al.

(10) Patent No.: US 10,248,086 B2
(45) Date of Patent: Apr. 2, 2019

(54) ELECTRONIC DEVICE FOR CONTROLLING AIR CONDITION BASED ON LOCATION INFORMATION AND METHOD OF OPERATING THE SAME

(71) Applicant: Samsung Electronics Co., Ltd, Gyeonggi-do (KR)

(72) Inventors: Ju-Eun Lee, Seoul (KR); Soog-Yeong Woo, Seoul (KR); Soon-Kyu Jang, Gyeonggi-do (KR); Eun-Ju Tae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 15/415,801

(22) Filed: Jan. 25, 2017

(65) Prior Publication Data

US 2017/0212485 A1    Jul. 27, 2017

(30) Foreign Application Priority Data

Jan. 25, 2016    (KR) .................. 10-2016-0008795

(51) Int. Cl.
| | |
|---|---|
| F24F 11/00 | (2018.01) |
| G05B 15/02 | (2006.01) |
| F24F 11/30 | (2018.01) |
| F24F 11/62 | (2018.01) |
| F24F 110/10 | (2018.01) |
| F24F 110/12 | (2018.01) |
| F24F 110/20 | (2018.01) |
| F24F 110/22 | (2018.01) |
| F24F 110/50 | (2018.01) |
| F24F 110/52 | (2018.01) |

(Continued)

(52) U.S. Cl.
CPC .............. *G05B 15/02* (2013.01); *F24F 11/30* (2018.01); *F24F 11/62* (2018.01); *F24F 11/63* (2018.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/52* (2018.01); *F24F 2110/64* (2018.01); *F24F 2120/20* (2018.01); *G05B 2219/2642* (2013.01); *Y02A 50/25* (2018.01); *Y02B 30/78* (2013.01)

(58) Field of Classification Search
None
See application file for complete search history.

(56) References Cited

U.S. PATENT DOCUMENTS

| | | | | |
|---|---|---|---|---|
| 2013/0289778 | A1* | 10/2013 | Ishizaka | G05D 23/1905 700/276 |
| 2014/0045482 | A1* | 2/2014 | Bisson | H04W 4/021 455/420 |

FOREIGN PATENT DOCUMENTS

| | | |
|---|---|---|
| EP | 1429083 A1 | 6/2004 |
| KR | 1020110097001 | 8/2011 |
| KR | 1020150095103 | 8/2015 |

* cited by examiner

Primary Examiner — Paul B Yanchus, III

(57) ABSTRACT

An electronic device includes a communication module configured to receive first sensing information from at least one first sensor located in a first area, and to receive second sensing information from at least one second sensor out of a plurality of sensors located in a second area, and a processor configured to control at least one air control device located in the first area to condition air in the first area based on the first sensing information and the second sensing information, wherein the processor is configured to select the second sensor based on a location of the electronic device.

15 Claims, 16 Drawing Sheets

(51) Int. Cl.
*F24F 110/64* (2018.01)
*F24F 120/20* (2018.01)
*F24F 11/63* (2018.01)

| NAME OF SENSOR | TYPE OF SENSOR | LOCATION OF SENSOR | |
|---|---|---|---|
| SENSOR 2-1 | TEMPERATURE SENSOR | POINT 1 | 490-1 |
| SENSOR 2-2 | HUMIDITY SENSOR | POINT 2 | 490-2 |
| SENSOR 2-3 | POLLUTION LEVEL SENSOR | POINT 3 | 490-3 |
| SENSOR 2-4 | TEMPERATURE SENSOR | POINT 4 | 490-4 |
| SENSOR 2-5 | HUMIDITY SENSOR | POINT 5 | 490-5 |

ELECTRONIC DEVICE FOR CONTROLLING AIR CONDITION BASED ON LOCATION INFORMATION AND METHOD OF OPERATING THE SAME

CROSS-REFERENCE TO RELATED APPLICATION(S) AND CLAIM OF PRIORITY

The present application is related to and claims the priority under 35 U.S.C. § 119(a) to Korean Application Serial No. 10-2016-0008795, which was filed in the Korean Intellectual Property Office on Jan. 25, 2016, the entire content of which is hereby incorporated by reference.

TECHNICAL FIELD

The present disclosure relates to an electronic device that controls air in the residential environment of a user, and a method of operating the same.

BACKGROUND

Recently, there has been a growing interest in the air condition due to an issue associated with fine dust or yellow dust. Air does not stay in one place and is invisible, and thus, it should be continuously checked. In this instance, the indoor air condition and the outdoor air condition need to be checked generally.

Conventionally, to check the air condition, a user may use information obtained from an outdoor sensor that is installed by a public institute, such as the Meteorological Administration, or the like. Also, the user may check the air condition through air condition sensed by a sensor included in an individual air control device.

The information provided from a public institute indicates information associated with the air condition in an inclusive administrative district, as opposed to the information associated with the residential district of a user. Also, the individual air control device senses only the air condition around the individual air control device and thus, may indicate information associated with only the air condition in a small scope.

SUMMARY

To address the above-discussed deficiencies, it is a primary object to provide Various embodiments of the present disclosure provide an electronic device that receives sensing information from a sensor installed in a predetermined scope of the residential area of a user, based on location information of installed outdoor sensors, and controls air in the residential environment of the user based on the received sensing information, and a method of operating the same.

According to embodiments of the present disclosure, there is provided an electronic device, including: a communication module that receives first sensing information from at least one first sensor located in a first area, and receives second sensing information from at least one second sensor out of a plurality of sensors located in a second area; and a processor that is configured to control at least one air control device located in the first area based on the first sensing information and the second sensing information, so as to control air condition in the first area, wherein the processor selects the second sensor based on a location of the electronic device.

According to embodiments of the present disclosure, there is provided an air control device, including: a communication module that receives, from a controller, a control signal to control air in a first area; and a processor that controls the air in the first area in response to the control signal, wherein the controller performs: receiving first sensing information from a first sensor located in the first area; receiving second sensing information from at least one second sensor out of a plurality of sensors located in a second area; and transmitting, to the air control device, the control signal based on the first sensing information and the second sensing information, and the second sensor is selected based on a location of the controller.

According to embodiments of the present disclosure, there is provided an operational method of an electronic device, the method including: receiving first sensing information from at least one first sensor located in a first area; receiving second sensing information from at least one second sensor out of a plurality of sensors located in a second area; and controlling air condition in the first area by controlling at least one air control device located in the first area based on the first sensing information and the second sensing information, wherein the second sensor is selected based on a location of the electronic device. An electronic device, according to embodiments of the present disclosure, receives sensing information from a sensor installed in a predetermined scope of the residential area of a user based on location information of sensors, and controls air in the residential environment of the user based on the received sensing information, thereby controlling air based on the air condition of the residential area where the user actually resides.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
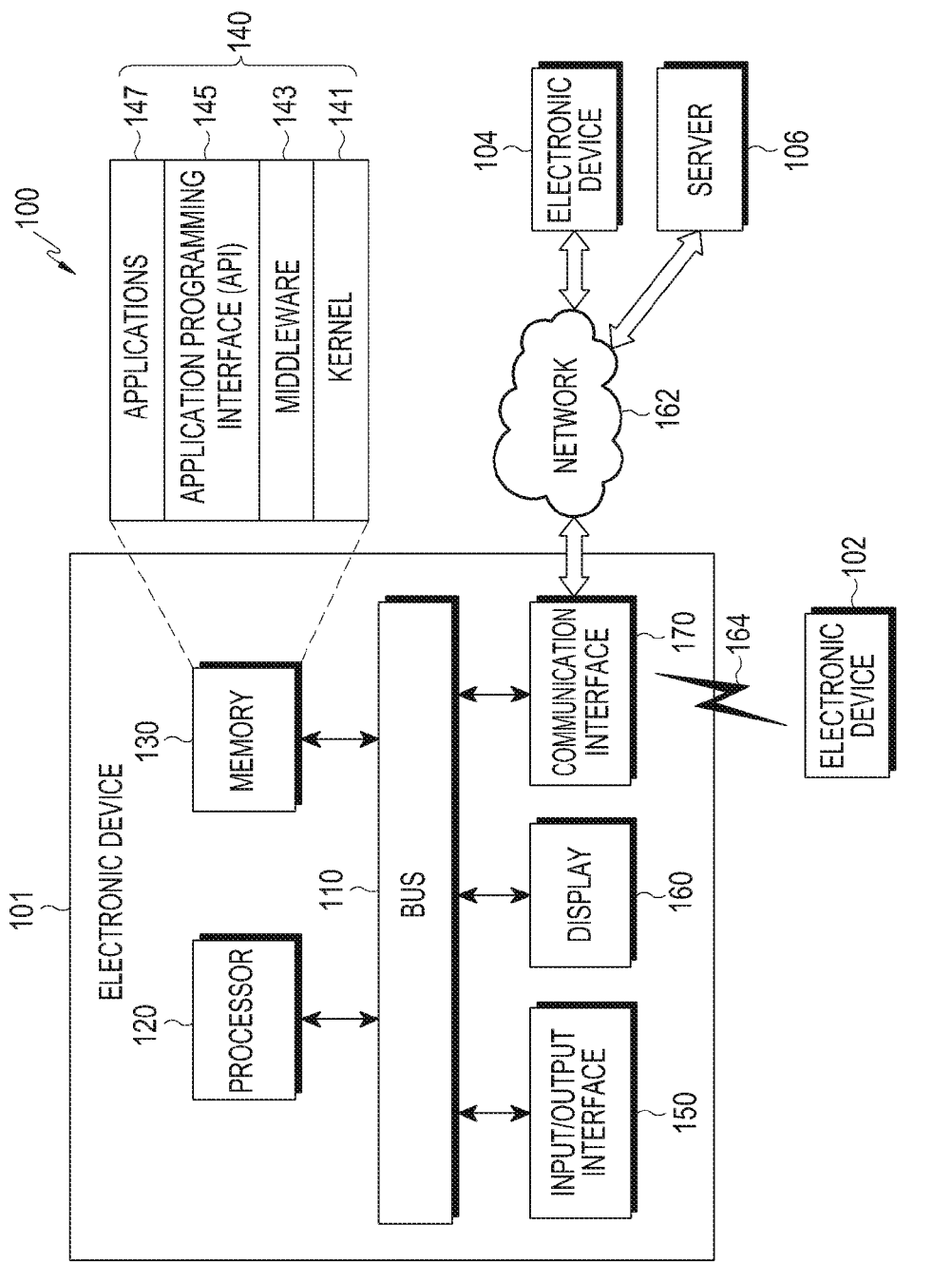
FIG. 1 illustrates an electronic device and a network according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure can include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device can include at least one of an accessory type (e.g., a watch, a ring, a bracelet, an anklet, a necklace, a glasses, a contact lens, or a Head- Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device can be a home appliance. The home appliance can include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device can include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device can include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure can be a combination of one or more of the aforementioned various devices. The electronic device according to some embodiments of the present disclosure can be a flexible device. Further, the electronic device according to an embodiment of the present disclosure is not limited to the aforementioned devices, and can include a new electronic device according to the development of technology.

Hereinafter, an electronic device according to various embodiments of the present disclosure will be described with reference to the accompanying drawings. In the present disclosure, the term "user" can indicate a person using an electronic device or a device (e.g., an artificial intelligence electronic device) using an electronic device.

An electronic device 101 in a network environment 100 according to various embodiments will be described with reference to FIG. 1. The electronic device 101 can include a bus 110, a processor 120, a memory 130, an input/output interface 150, a display 160, and a communication interface 170. According to an embodiment of the present disclosure, the electronic device 101 can omit at least one of the above elements or can further include other elements.

The bus 110 can include, for example, a circuit that interconnects the elements 110 to 170 and delivers communication (e.g., a control message and/or data) between the elements 110 to 170.

The processor 120 can include one or more of a central processing unit (CPU), an application processor (AP), and a communication processor (CP). The processor 120, for example, can carry out operations or data processing relating to the control and/or communication of at least one other element of the electronic device 101.

The memory 130 can include a volatile and/or non-volatile memory. The memory 130 can store, for example, instructions or data relevant to at least one other element of the electronic device 101. According to an embodiment of the present disclosure, the memory 130 can store software and/or a program 140. The program 140 can include, for example, a kernel 141, middleware 143, an application programming interface (API) 145, and/or application programs (or "applications") 147. At least some of the kernel 141, the middleware 143, and the API 145 can be referred to as an operating system (OS).

For example, the kernel 141 can control or manage the system resources (e.g., the bus 110, the processor 120, the memory 130, or the like) that are used to execute operations or functions implemented in the other programs (e.g., the middleware 143, the API 145, and the application programs 147). Furthermore, the kernel 141 can provide an interface through which the middleware 143, the API 145, or the application programs 147 can access the individual elements of the electronic device 101 to control or manage the system resources.

The middleware 143 can function as, for example, an intermediary for allowing the API 145 or the application programs 147 to communicate with the kernel 141 to exchange data.

Furthermore, the middleware 143 can process one or more task requests, which are received from the application programs 147, according to priorities thereof. For example, the middleware 143 can assign priority to at least one of the application programs 147 in association with using the system resources (e.g., the bus 110, the processor 120, the memory 130, or the like) of the electronic device 101. For example, the middleware 143 can perform scheduling or loading balancing on the one or more task requests by processing the one or more task requests according to the priority assigned to the at least one application program.

The API 145, which is an interface through which the applications 147 control functions provided from the kernel 141 or the middleware 143 can include, for example, at least one interface or function (e.g., instruction) for file control, window control, image processing, text control, or the like.

The input/output interface 150 can function as, for example, an interface that can forward instructions or data, which are input from a user or an external device, to the other element(s) of the electronic device 101. Furthermore, the input/output interface 150 can output instructions or data, which are received from the other element(s) of the electronic device 101, to a user or an external device.

The display 160 can include, for example, a liquid crystal display (LCD), a light emitting diode (LED) display, an organic light emitting diode (OLED) display, a microelectromechanical system (MEMS) display, or an electronic paper display. The display 160 can display, for example, various types of contents (e.g., text, images, videos, icons, symbols, or the like) for a user. The display 160 can include a touch screen and can receive, for example, a touch input, a gesture input, a proximity input, or a hovering input using an electronic pen or a part of the user's body.

The communication interface 170 can establish communication, for example, between the electronic device 101 and an external device (e.g., a first external electronic device 102, a second external electronic device 104, or a server 106). For example, the communication interface 170 can be connected to a network 162 through wireless or wired communication to communicate with an external device (e.g., the second external electronic device 104 or the server 106).

The wireless communication can use at least one of, for example, long term evolution (LTE), LTE-advance (LTE-A), code division multiple access (CDMA), wideband CDMA (WCDMA), universal mobile telecommunications system (UMTS), WiBro (Wireless Broadband), global system for mobile communications (GSM), or the like, as a cellular communication protocol. In addition, the wireless communication can include, for example, short range communication 164. The short-range communication 164 can include at least one of, for example, Wi-Fi, Bluetooth, near field communication (NFC), magnetic stripe transmission (MST), global navigation satellite system (GNSS), and the like. The GNSS can include at least one of, for example, a global positioning system (GPS), a global navigation satellite system (Glonass), a Beidou navigation satellite system (hereinafter referred to as "Beidou"), and a European global satellite-based navigation system (Galileo), according to a use area, a bandwidth, or the like. Hereinafter, in the present disclosure, the "GPS" can be interchangeably used with the "GNSS". The wired communication can include, for example, at least one of a universal serial bus (USB), a high definition multimedia interface (HDMI), recommended standard-232 (RS-232), a plain old telephone service (POTS), and the like. The network 162 can include at least one of communication networks such as a computer network (e.g., a LAN or a WAN), the Internet, and a telephone network.

Each of the first and second external electronic devices 102 and 104 can be of a type that is identical to, or different from, that of the electronic device 101. According to an embodiment of the present disclosure, the server 106 can include a group of one or more servers. According to various embodiments of the present disclosure, all or some of the operations executed by the electronic device 101 can be executed by another electronic device, a plurality of electronic devices (e.g., the electronic devices 102 and 104), or the server 106. According to an embodiment of the present disclosure, when the electronic device 101 has to perform a function or a service automatically or by request, the electronic device 101 can request another device (e.g., the electronic device 102 or 104, or the server 106) to perform at least some functions relating thereto instead of autonomously performing the function or service, or in addition to performing the function or service. Another electronic device (e.g., the electronic device 102 or 104, or the server 106) can execute the requested functions or the additional functions, and can deliver a result of the execution to the electronic device 101. The electronic device 101 can provide the received result as it is, or can additionally process the received result to provide the requested functions or services. To this end, for example, cloud computing, distributed computing, or client-server computing technology can be used.

Figure 2:
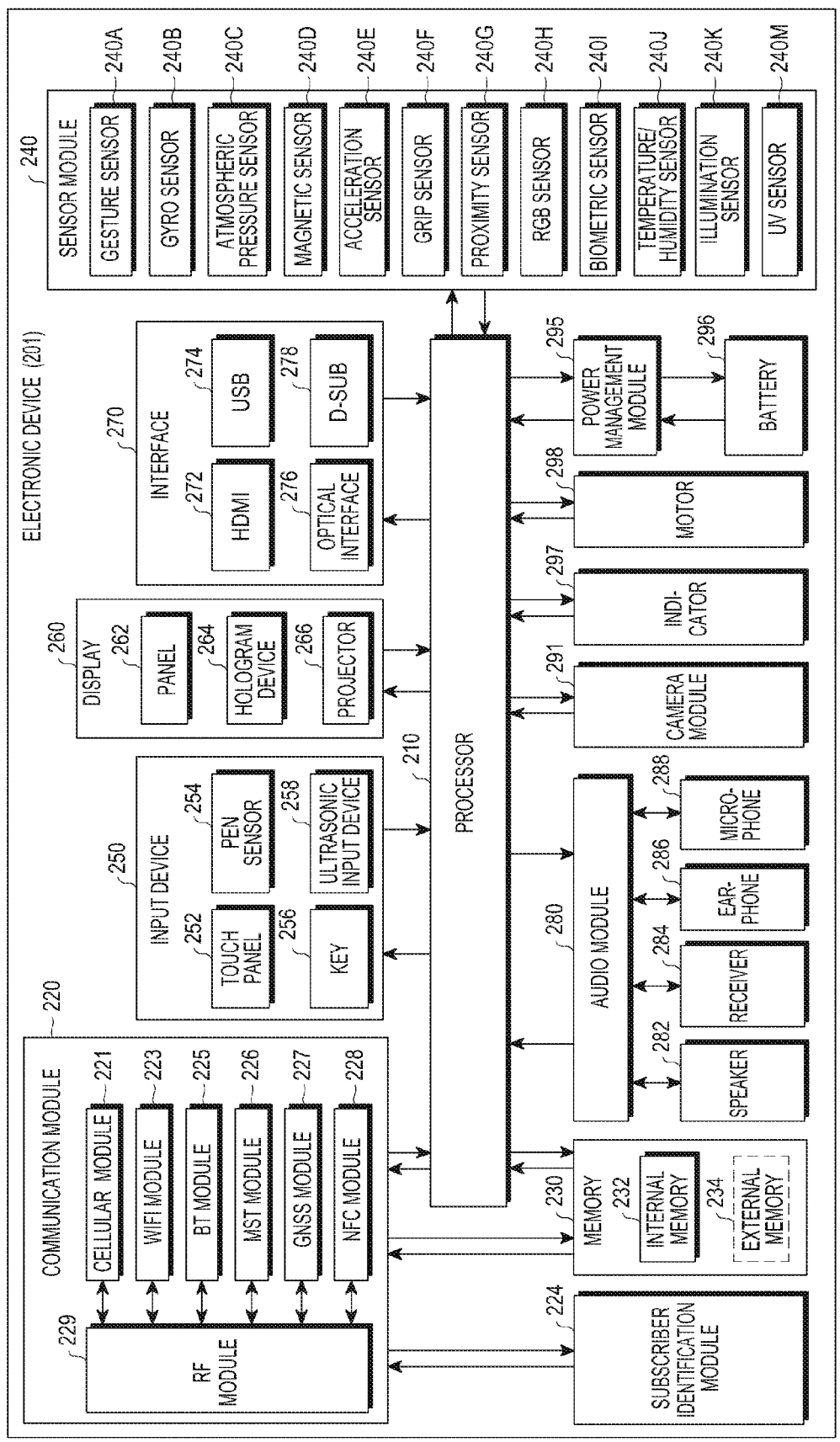
FIG. 2 illustrates an electronic device according to various embodiments of the present disclosure.

FIG. 2 is a block diagram of an electronic device 201 according to various embodiments of the present disclosure. The electronic device 201 can include, for example, the entirety or a part of the electronic device 101 illustrated in FIG. 1. The electronic device 201 can include at least one processor 210 (e.g., an application processor (AP)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 can drive, for example, an operating system or an application program to control a plurality of hardware or software elements connected thereto and can perform various types of data processing and operations. The processor 210 can be embodied as, for example, a system on chip (SoC). According to an embodiment of the present disclosure, the processor 210 can further include a graphic processing unit (GPU) and/or an image signal processor. The processor 210 can also include at least some (e.g., a cellular module 221) of the elements illustrated in FIG. 2. The processor 210 can load, into a volatile memory, instructions or data received from at least one (e.g., a non-volatile memory) of the other elements, can process the loaded instructions or data, and can store various data in a non-volatile memory.

The communication module 220 can have a configuration identical or similar to that of the communication interface 170 illustrated in FIG. 1. The communication module 220 can include, for example, a cellular module 221, a Wi-Fi module 222, a Bluetooth module 223, a GNSS module 224 (e.g., a GPS module, a Glonass module, a Beidou module, or a Galileo module), an NFC module 225, an MST module 226, and a radio frequency (RF) module 227.

The cellular module 221, for example, can provide a voice call, a video call, a text message service, Internet service, or the like through a communication network. According to an embodiment of the present disclosure, the cellular module 221 can identify and authenticate the electronic device 201 within a communication network using the subscriber identification module 224 (e.g., a SIM card). According to an embodiment of the present disclosure, the cellular module 221 can perform at least some of the functions that the processor 210 can provide. According to an embodiment of the present disclosure, the cellular module 221 can include a communication processor (CP).

Each of the Wi-Fi module 223, the Bluetooth module 225, the GNSS module 227, the NFC module 228 and the MST module 226 can include, for example, a processor for processing data transmitted and received through a corresponding module. According to an embodiment of the present disclosure, at least some (e.g., two or more) of the cellular module 221, the Wi-Fi module 223, the Bluetooth module 225, the GNSS module 227, the NFC module 228, and the MST module 226 can be included in one Integrated Chip (IC) or IC package.

The RF module 229, for example, can transmit/receive a communication signal (e.g., an RF signal). The RF module 229 can include, for example, a transceiver, a power amplifier module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227, the NFC module 228, and the MST module 226 can transmit and receive RF signals through a separate RF module.

The subscriber identification module 224 can include, for example, a card including a subscriber identification module and/or an embedded SIM, and can contain unique identification information (e.g., an integrated circuit card identifier (ICCID)) or subscriber information (e.g., an international mobile subscriber identity (IMSI)).

The memory 230 (e.g., the memory 130) can include, for example, an embedded memory 232 or an external memory 234. The embedded memory 232 can include, for example, at least one of a volatile memory (e.g., a dynamic random access memory (DRAM), a static RAM (SRAM), a synchronous dynamic RAM (SDRAM), or the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, a solid state drive (SSD)).

The external memory 234 can further include a flash drive, for example, a compact flash (CF), a secure digital (SD), a micro secure digital (Micro-SD), a mini secure digital (Mini-SD), an extreme digital (xD), a multi-media card (MMC), a memory stick, or the like. The external memory 234 can be functionally and/or physically connected to the electronic device 201 through various interfaces.

The sensor module 240, for example, can measure a physical quantity or can sense an operation state of the electronic device 201, and can convert the measured or sensed information into an electric signal. The sensor module 240 can include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 2401, a temperature/humidity sensor 240J, an illumination sensor 240K, and a ultraviolet (UV) sensor 240M. Additionally or alternatively, the sensor module 240 can include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling one or more sensors included in the sensor module 240. According to an embodiment of the present disclosure, the electronic device 201 can further include a processor, which is configured to control the sensor module 240, as a part of the processor 210 or separately from the processor 210, in order to control the sensor module 240 while the processor 210 is in a sleep state.

The input device 250 can include, for example, a touch panel 252, a (digital) pen sensor 254, a key 256, or an ultrasonic input device 258. The touch panel 252 can use, for example, at least one of a capacitive type, a resistive type, an infrared type, and an ultrasonic type. Also, the touch panel 252 can further include a control circuit. The touch panel 252 can further include a tactile layer to provide a tactile reaction to a user.

The (digital) pen sensor 254 can include, for example, a recognition sheet that is a part of, or separate from, the touch panel. The key 256 can include, for example, a physical button, an optical key, or a keypad. The ultrasonic input device 258 can detect ultrasonic waves, which are generated by an input tool, through a microphone (e.g., a microphone 288), and can determine data corresponding to the detected ultrasonic waves.

The display 260 (e.g., the display 160) can include a panel 262, a hologram device 264 or a projector 266. The panel 262 can have a configuration that is the same as, or similar to, that of the display 160 illustrated in FIG. 1. The panel 262 can be embodied to be, for example, flexible, transparent, or wearable. The panel 262, together with the touch panel 252, can be embodied as one module. The hologram device 264 can show a three-dimensional image in the air using an interference of light. The projector 266 can display an image by projecting light onto a screen. The screen can be located, for example, inside or outside the electronic device 201. According to an embodiment of the present disclosure, the display 260 can further include a control circuit for controlling the panel 262, the hologram device 264, or the projector 266.

The interface 270 can include, for example, a high-definition multimedia interface (HDMI) 272, a universal serial bus (USB) 274, an optical interface 276, or a D-sub-miniature (D-sub) 278. The interface 270 can be included, for example, in the communication interface 170 illustrated in FIG. 1. Additionally or alternatively, the interface 270 can include, for example, a mobile high-definition link (MHL) interface, a secure digital (SD) card/multi-media card (MMC) interface, or an Infrared data association (IrDA) standard interface.

For example, the audio module 280 can bidirectionally convert between a sound and an electrical signal. At least some elements of the audio module 280 can be included, for example, in the input/output interface 150 illustrated in FIG. 1. The audio module 280 can process sound information that is input or output through, for example, a speaker 282, a receiver 284, earphones 286, the microphone 288, or the like.

The camera module 291 is, for example, a device that can photograph a still image and a video. According to an embodiment of the present disclosure, the camera module 291 can include one or more image sensors (e.g., a front sensor or a back sensor), a lens, an image signal processor (ISP) or a flash (e.g., LED, xenon lamp, or the like).

The power management module 295 can manage, for example, the power of the electronic device 201. According to an embodiment of the present disclosure, the power management module 295 can include a power management integrated circuit (PMIC), a charger integrated circuit (IC), or a battery or fuel gauge. The PMIC can use a wired and/or wireless charging method. The wireless charging method can include, for example, a magnetic resonance method, a magnetic induction method, an electromagnetic wave method, and the like. Additional circuits (e.g., a coil loop, a resonance circuit, a rectifier, or the like) for wireless charging can be further included. The battery gauge can measure, for example, the residual amount of the battery 296, and voltage, current, or temperature while charging. The battery 296 can include, for example, a rechargeable battery and/or a solar battery.

The indicator 297 can indicate a particular state (e.g., a boot-up state, a message state, a charging state, or the like) of the electronic device 201 or a part (e.g., the processor 210) thereof. The motor 298 can convert an electrical signal into a mechanical vibration, and can generate a vibration, a haptic effect, or the like. Although not illustrated, the electronic device 201 can include a processing device (e.g., a GPU) for supporting a mobile TV. The processing device for supporting a mobile TV can process media data according to a standard, for example, digital multimedia broadcasting (DMB), digital video broadcasting (DVB), mediaFLO®, or the like.

Each of the above-described component elements of hardware according to the present disclosure can be configured with one or more components, and the names of the corresponding component elements can vary based on the type of electronic device. In various embodiments, the electronic device can include at least one of the above-described elements. Some of the above-described elements can be omitted from the electronic device, or the electronic device can further include additional elements. Also, some elements of the electronic device according to various embodiments can be combined into one entity, which can perform functions identical to those of the corresponding elements before the combination.

Figure 3:
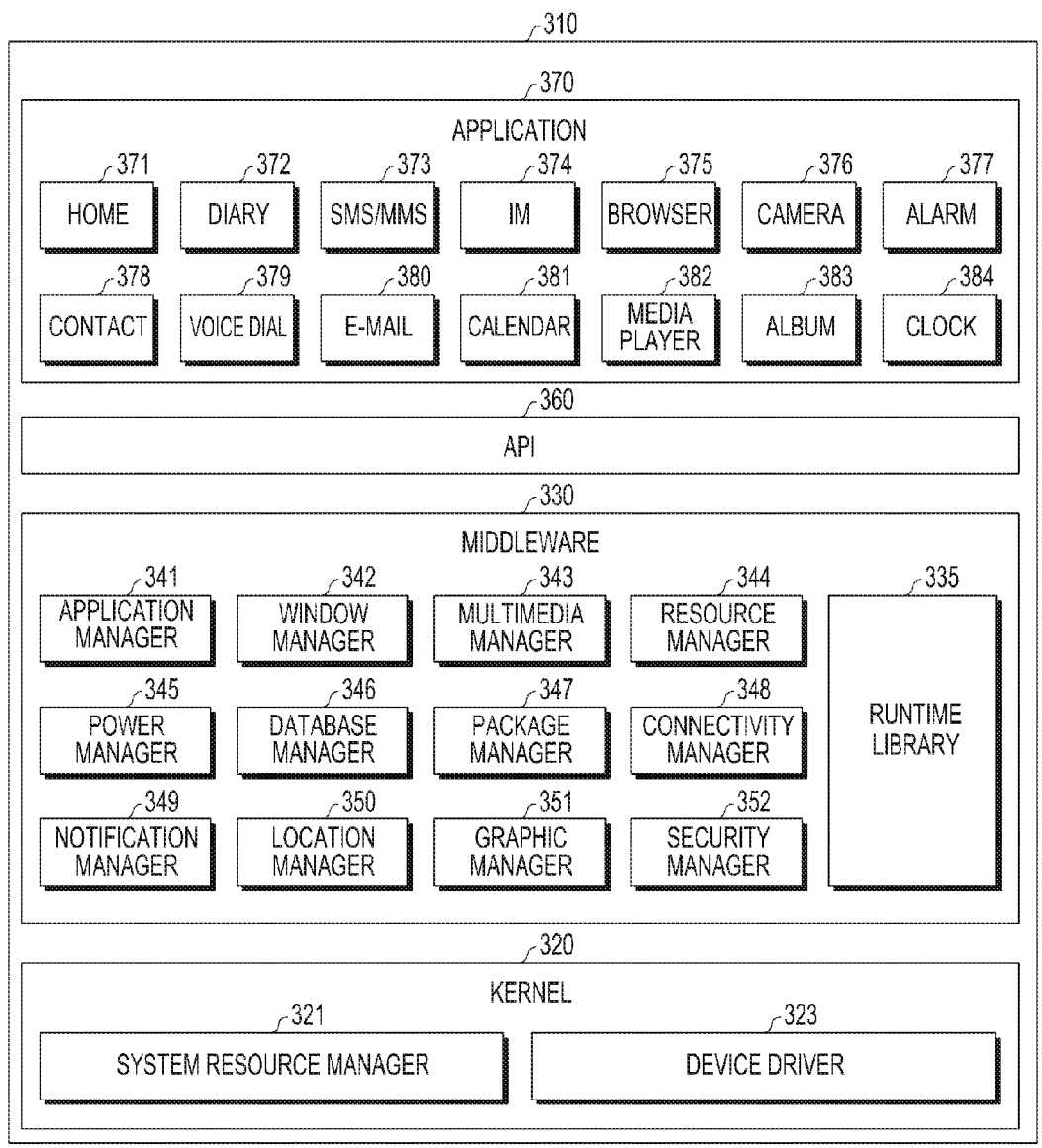
FIG. 3 illustrates a program module according to various embodiments of the present disclosure.

FIG. 3 is a block diagram of a program module according to various embodiments of the present disclosure. According to an embodiment of the present disclosure, a program module 310 (e.g., the program 140) can include an operating system (OS) for controlling resources related to an electronic device (e.g., the electronic device 101) and/or various applications (e.g., the application programs 147) executed in the operating system. The operating system can be, for example, Android®, iOS®, Windows®, Symbian®, Tizen®, Bada°, or the like.

The program module 310 can include a kernel 320, middleware 330, an application programming interface (API) 360, and/or applications 370. At least some of the program module 310 can be preloaded on the electronic device, or can be downloaded from an external electronic device (e.g., the electronic device 102 or 104, or the server 106).

The kernel 320 (e.g., the kernel 141) can include, for example, a system resource manager 321 and/or a device driver 323. The system resource manager 321 can control, assign, or retrieve system resources. According to an embodiment of the present disclosure, the system resource manager 321 can include a process manager, a memory manager, a file system manager, or the like. The device driver 323 can include, for example, a display driver, a camera driver, a Bluetooth driver, a shared memory driver, a USB driver, a keypad driver, a WiFi driver, an audio driver, or an inter-process communication (IPC) driver.

The middleware 330, for example, can provide a function required by the applications 370 in common, or can provide various functions to the applications 370 through the API 360 so that the applications 370 can efficiently use the limited system resources of the electronic device. According to an embodiment of the present disclosure, the middleware 330 (e.g., the middleware 143) can include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module that a compiler uses in order to add a new function through a programming language while the applications 370 are executed. The runtime library 335 can perform functions that are related to the management of input and output, the management of a memory, an arithmetic function, or the like.

The application manager 341 can, for example, manage a life cycle of at least one of the applications 370. The window manager 342 can manage graphical user interface (GUI) resources used on a screen. The multimedia manager 343 can recognize a format required to reproduce various media files, and can encode or decode a media file by using a coder/decoder (codec) appropriate for a corresponding format. The resource manager 344 can manage resources, such as a source code of at least one of the applications 370, a memory, a storage space, or the like.

The power manager 345 can operate together with, for example, a basic input/output system (BIOS) to manage a battery or power, and can provide power information required for the operation of the electronic device. The database manager 346 can generate, search, or change a database to be used by at least one of the applications 370. The package manager 347 can manage the installation or updating of an application distributed in the form of a package file.

The connectivity manager 348 can manage a wireless connection, for example, Wi-Fi, Bluetooth, or the like. The notification manager 349 can display or notify of an event, such as an arrival message, an appointment, notification of proximity, or the like, in such a manner as not to disturb a user. The location manager 350 can manage the location information of the electronic device. The graphic manager 351 can manage a graphic effect to be provided to a user and a user interface relating to the graphic effect. The security manager 352 can provide all security functions required for system security, user authentication, or the like. According to an embodiment of the present disclosure, in the case where the electronic device (e.g., the electronic device 101) has a telephone call function, the middleware 330 can further include a telephony manager for managing a voice or video call function of the electronic device.

The middleware 330 can include a middleware module that forms a combination of various functions of the above-described elements. The middleware 330 can provide modules that are specialized according to the types of operating systems in order to provide differentiated functions. Furthermore, the middleware 330 can dynamically remove some of the existing elements, or can add new elements.

The API 360 (e.g., the API 145) is, for example, a set of API programming functions, and can be provided in different configurations according to operating systems. For example, in the case of Android® or iOS®, one API set can be provided for each platform, and in the case of Tizen®, two or more API sets can be provided for each platform.

The applications 370 (e.g., the application programs 147) can include one or more applications that can perform functions, for example, home 371, dialer 372, SMS/MMS 373, instant message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., atmospheric pressure, humidity, temperature information, or the like).

According to an embodiment of the present disclosure, the applications 370 can include an application (hereinafter, referred to as an "information exchange application" for convenience of description) that supports exchanging information between the electronic device (e.g., the electronic device 101) and an external electronic device (e.g., the electronic device 102 or 104). The information exchange application can include, for example, a notification relay application for transferring specific information to an external electronic device or a device management application for managing an external electronic device.

For example, the notification relay application can include a function of transferring, to the external electronic device (e.g., the electronic device 102 or 104), notification information that is generated from the other applications (e.g., the SMS/MMS application, the e-mail application, the health care application, the environmental information application, or the like) of the electronic device. Furthermore, the notification relay application, for example, can receive notification information from an external electronic device and can provide the received notification information to a user.

The device management application can manage (e.g., install, delete, or update), for example, at least one function of an external electronic device (e.g., the electronic device 102 or 104) that communicates with the electronic device (e.g., a function of turning on/off the external electronic device itself (or some elements thereof) or a function of adjusting the brightness (or resolution) of a display), applications that operate in the external electronic device, or services (e.g., a call service, a message service, or the like) that are provided by the external electronic device.

According to an embodiment of the present disclosure, the applications 370 can include applications (e.g., a health care application of a mobile medical appliance, and the like) designated according to the attributes of an external electronic device (e.g., the electronic device 102 or 104). According to an embodiment of the present disclosure, the applications 370 can include applications that are received from an external electronic device (e.g., the server 106, or the electronic device 102 or 104). According to an embodiment of the present disclosure, the applications 370 can include a preloaded application or a third party application that can be downloaded from a server. The names of the elements of the program module 310 according to the illustrated embodiment can vary according to the type of operating system.

According to various embodiments of the present disclosure, at least a part of the programming module 310 can be embodied as software, firmware, hardware, or a combination of two or more thereof. At least a part of the program module 310 can be implemented (e.g., executed) by, for example, a processor (e.g., the processor 210). At least a part of the program module 310 can include, for example, a module, a program, a routine, a set of instructions, a process, or the like for performing one or more functions.

The term "module" as used herein can, for example, mean a unit including one of hardware, software, and firmware or a combination of two or more of them. The "module" can be interchangeably used with, for example, the term "unit", "logic", "logical block", "component", or "circuit". The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure can be implemented by a command stored in a computer-readable storage medium in a programming module form. The instruction, when executed by a processor (e.g., the processor 120), can cause the one or more processors to execute the function corresponding to the instruction. The computer-readable storage medium can be, for example, the memory 130.

The computer readable recoding medium can include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

The programming module according to the present disclosure can include one or more of the aforementioned components or can further include other additional components, or some of the aforementioned components can be omitted. Operations executed by a module, a programming module, or other component elements according to various embodiments of the present disclosure can be executed sequentially, in parallel, repeatedly, or in a heuristic manner. Furthermore, some operations can be executed in a different order or can be omitted, or other operations can be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
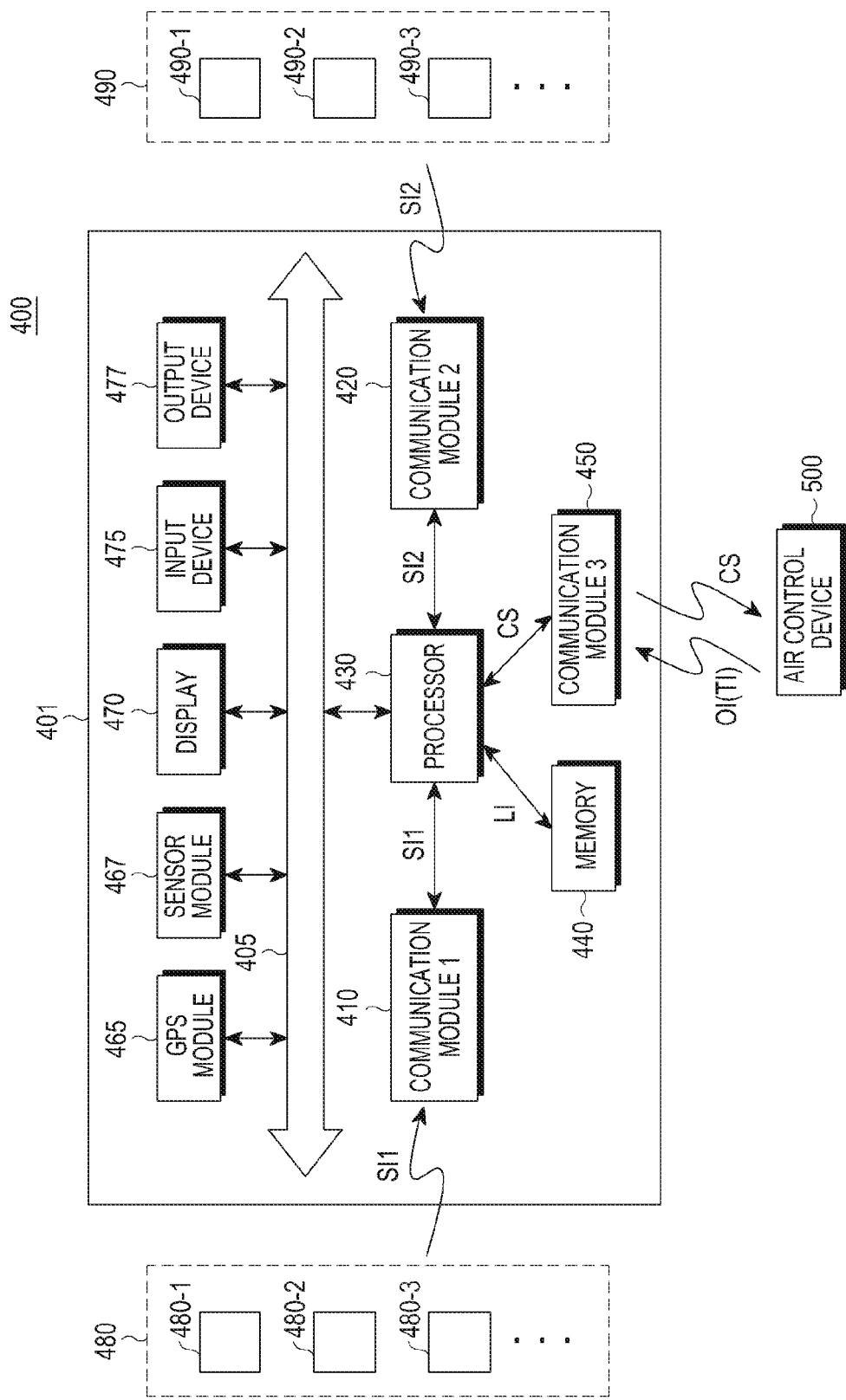
FIG. 4 schematically illustrates an air control system according to various embodiments of the present disclosure.

FIG. 4 is a block diagram schematically illustrating an air control system according to various embodiments of the present disclosure.

Referring to FIG. 4, an air control system 400 can include, an electronic device 401, a plurality of first sensors 480, a plurality of second sensors 490, and an air control device 500.

The air control system 400 can be a system in which the electronic device 401 controls the air control device 500 in response to sensing information transmitted from the plurality of first sensors 480 and the plurality of second sensors 490, so as to control the indoor air condition.

For example, the air control system 400 can be embodied as a smart network system, such as a smart city, a smart home, a smart building, office automation, home automation, and/or smart community.

In the present specifications, a first area can indicate an indoor area or an indoor space, and a second area can indicate an outdoor area or an outdoor space. In this instance, the indoor area and the outdoor area can be determined based on a space where the electronic device 401 is installed. For example, when the electronic device 401 is installed in a residential area (e.g., the area inside a house) of a user, the first area can indicate the area inside the residential area of the user, and the second area can indicate the area outside the residential area of the user. Also, when the electronic device 401 is installed in an office area (e.g., an office) of a user, the first area can indicate the area inside the office area of the user, and the second area can indicate the area outside the office area of the user.

The electronic device 401 can control the indoor air condition in response to sensing information transmitted from the plurality of first sensors 480 and the plurality of second sensors 490. Also, the electronic device 401 can receive sensing information from the plurality of first sensors 480 and the plurality of second sensors 490, in real time or periodically, and can control the indoor air condition in response to the received sensing information.

According to an embodiment of the present disclosure, the electronic device 401 can control the air control device 500 to as to control the indoor air condition in response to sensing information.

For example, the electronic device 401 can be embodied to be substantially the same as, or similar to, the electronic device of FIG. 1 and the electronic device 201 of FIG. 2. For example, the electronic device 401 can be embodied as a home automation device, an office automation device, a home computer, a network device, and/or a hub.

The plurality of first sensors 480 can indicate the sensors located in the first area. For example, the first area indicates an indoor area or an indoor space.

The plurality of first sensors 480 can include homogeneous or heterogeneous sensors 480-1 to 480-n (here, m is a natural number that is greater than or equal to 2).

According to an embodiment of the present disclosure, at least one of the plurality of first sensors 480 can transmit first sensing information (SI1) to the electronic device 401.

The first sensing information (SI1) can indicate information associated with the air condition that at least one of the plurality of first sensors 480 senses. In this instance, the first sensing information (SI1) can indicate information that is obtained by sensing the air condition around at least one of the plurality of first sensors 480. For example, the first sensing information (SI1) can indicate information associated with the air condition of an indoor area or an indoor space.

For example, the first sensing information (SI1) can include information associated with the temperature, the humidity, the fine dust concentration, the harmful gas concentration, and/or the air pollution level of an indoor area or an indoor space.

The plurality of second sensors 490 can indicate sensors located in the second area. For example, the second area indicates an outdoor area or an outdoor space.

The plurality of second sensors 490 can include homogeneous or heterogeneous sensors 490-1 to 490-n (here, m is a natural number that is greater than or equal to 2).

According to an embodiment of the present disclosure, at least one of the plurality of second sensors 490 can transmit second sensing information (SI2) to the electronic device 401.

The second sensing information (SI2) can indicate information associated with air condition that at least one of the plurality of second sensors 490 senses. In this instance, the second sensing information (SI2) can indicate information that is obtained by sensing the air condition around at least one of the plurality of second sensors 490. For example, the second sensing information (SI2) can indicate information associated with the air condition of an outdoor area or an outdoor space.

For example, the second sensing information (SI2) can include information associated with the temperature, the humidity, the fine dust concentration, the harmful gas concentration, an ultraviolet ray index, and/or the air pollution level of an outdoor area or an outdoor space.

For example, the plurality of first sensors 480 and the plurality of second sensors 490 may be embodied as a sensor that is capable of sensing the ambient air condition, such as a temperature sensor, a humidity sensor, a fine dust sensor, an air pollution level sensor, an ultraviolet sensor, and/or a harmful gas sensor, and the like.

Although FIG. 4 illustrates that the air control system 400 includes the plurality of first sensors 480 and the plurality of second sensors 490, the technical concept of the present disclosure may not be limited thereto, and the air control system 400 can include a single first sensor and a single second sensor.

The electronic device 401 can include a first communication module 410, a second communication module 420, a processor 430, a memory 440, and a third communication module 450. The electronic device 401 can further include a GPS module 465, a sensor module 467, a display 470, an input device 475, and an output device 477. In this instance, each of the elements 465, 467, 470, 475, and/or 477 of the electronic device 401 is capable of transmitting/receiving data or information to/from the processor 430 through a bus 405.

The first communication module 410 can receive first sensing information (SI1) from at least one first sensor (e.g., the first sensor 480-1) out of the plurality of first sensors 480.

The first communication module 410 can transmit the received first sensing information (SI1) to the processor 430.

The second communication module 420 can receive second sensing information (SI2) from at least one second sensor (e.g., the first sensor 490-1) out of the plurality of second sensors 490.

The second communication module 420 can transmit the received second sensing information (SI2) to the processor 430.

The processor 430 can control general operations of the electronic device 401.

According to an embodiment of the present disclosure, the processor 430 can receive the first sensing information (SI1) and the second sensing information (S12). The processor 430 can control the air condition of the first area based on the first sensing information (SI1) and the second sensing information (SI2). According to an embodiment of the present disclosure, the processor 430 can control at least one air control device 500 that is located in the first area based on the first sensing information (SI1) and the second sensing information (SI2).

The processor 430 can control the air condition of the first area based on a standard air condition. In this instance, the standard air condition can be set by a user or can be automatically set by the processor 430.

Also, the processor 430 can set a mode associated with the standard air condition. In this instance, the mode can be set by the user or can be automatically set by the processor 430.

The standard air condition can indicate a standard value used for controlling the air condition of the first area. For example, the standard air condition can indicate a standard value in association with the temperature, the humidity, and/or the air pollution level of the first area.

For example, when the standard air condition includes a temperature value, the processor 430 and can control the temperature of the first area to be the temperature value indicated by the standard air condition by controlling the air control device 500. For example, when the standard air condition indicates a temperature of 20 degrees Celsius, the processor 430 can control the temperature of the first area to be 20 degrees Celsius by controlling the air control device 500.

Also, when the standard air condition includes a humidity value, the processor 430 can control the humidity of the first area to be the humidity value indicated by the standard air condition by controlling the air control device 500. For example, when the standard air condition indicates a humidity of 50%, the processor 430 can control the humidity of the first area to be the humidity of 50% by controlling the air control device 500.

The standard air condition can include different standards based on a mode set by the user. For example, the mode set by the user can include a sleep mode, a going-out mode, an exercise mode, an energy-saving mode, and the like.

For example, in the sleep mode, the standard air condition can include a temperature value, a humidity value, and an air cleanliness value, which are appropriate for sleep. In the going-out mode, the standard air condition can include a temperature value, a humidity value, and an air cleanliness value, which takes into consideration that a user does not exist in an indoor space. In the exercise mode, the standard air condition can include a temperature value, a humidity value, and an air cleanliness value, all of which are appropriate for exercise.

In the energy-saving mode, the processor 430 can control the air control device 500 to minimize power consumption. For example, when the air control device 500 is an air conditioner, the processor 430 can set the set temperature of the air conditioner to be a high temperature. Also, when the air control device 500 is a smart door, the processor 430 can control the air condition through ventilation.

The processor 430 can set the location of the electronic device 401. According to an embodiment of the present disclosure, the processor 430 can set the location of the electronic device 401 by using a GPS signal received from the GPS module 465.

The processor 430 can control the air condition based on the set location of the electronic device 401.

According to an embodiment of the present disclosure, the processor 430 can select at least one second sensor 490-1 to 490-$n$ that is close to the location of the electronic device 401, out of the plurality of second sensors 490, and can receive second sensing information (SI2) from the at least one selected second sensor 490-1 to 490-$n$. Also, the processor 430 can select at least one first sensor 480-1 to 480-$m$ from among the plurality of first sensors 480 based on the location of the electronic device 401, and can receive first sensing information (SI1) from the at least one selected first sensor 480-1 to 480-$m$.

When the location of the electronic device 401 is set, the processor 430 can determine the location of the electronic device 401 as the location of a user, and can efficiently control the air condition of a user's actual life environment.

The memory 440 can store location information (L1) of the plurality of second sensors 490.

The memory 440 can transmit the location information (L1) to the processor 430 under the control of the processor 430.

The memory 440 can be embodied as a non-volatile memory. For example, the memory 440 can be embodied as a flash memory, an embedded multimedia card (eMMC), a universal flash storage (UFS), a solid state device (SSD), and/or a hard disk drive (HDD).

Also, the memory 440 can store a standard air condition set by a user or the processor 430. The memory 440 can transmit the standard air condition to the processor 430 under the control of the processor 430.

The third communication module 450 can transmit a control signal (CS) to the air control device 500 under the control of the processor 430. The control signal (CS) can indicate a signal that indicates that the electronic device 401 controls the air control device 500.

The third communication module 450 can receive operation information (OI) from the air control device 500 under the control of the processor 430. Also, the third communication module 450 can receive operation termination information (TI) from the air control device 500 under the control of the processor 430.

The third communication module 450 can transmit the operation information (OI) and the operation termination information (TI) to the processor 430.

In FIG. 4, for ease of description, it is defined that a communication module that transmits/receives data to/from the plurality of first sensors 480 is the first communication module 410, a communication module that transmits/receives data to/from the plurality of second sensors 490 is the second communication module 420, and a communication module that transmits/receives data to/from the air control device 500 is the third communication module 450, but the technical concept of the present disclosure may not be limited thereto.

According to an embodiment of the present disclosure, the first communication module 410, the second communication module 420, and the third communication module 450 can be embodied as a single communication module. For example, the electronic device 401 can transmit/receive data to/from the plurality of first sensors 480, the plurality of second sensors 490, and the air control device 500, through a single communication module.

The GPS module 465 can receive information associated with the location of the electronic device 401 under the control of the processor 430. For example, the GPS module 465 can receive a GPS signal, and can transmit the GPS signal to the processor 430.

According to an embodiment of the present disclosure, the processor 430 can receive information associated with the location of the electronic device 401 using the GPS module 465, and can set the location of the electronic device 401.

The sensor module 467 can sense the air condition around the electronic device 401. The sensor module 467 can transmit sensing information to the processor 430.

For example, the sensor module 467 can be embodied as a sensor that is capable of sensing the ambient air condition, such as a temperature sensor, a humidity sensor, a fine dust sensor, an air pollution level sensor, an ultraviolet sensor, and/or a harmful gas sensor, and the like. That is, the sensor module 467 can indicate an embedded sensor of the electronic device 401.

The display 470 can display information associated with the air condition of the first area under the control of the processor 430. For example, the processor 430 can provide, through the display 470, a user with information associated with the air condition of the first area based on the first sensing information (SI1) and the second sensing information (SI2).

The input device 475 can receive a standard air condition input by a user. The input device 457 can transmit, to the processor 430, the standard air condition that is input by the user.

For example, the input device 475 can be embodied as a touch screen that is in contact with a display. Also, the input device 475 can be embodied as a motion recognition device, a voice recognition device, a keyboard, and/or a touchpad.

The output device 477 can output an alarm associated with the air condition of the first area under the control of the processor 430. For example, the processor 430 can provide, through the output device 477, a user with an alarm associated with the air condition of the first area based on the first sensing information (SI1) and the second sensing information (SI2).

For example, the output device 477 can be embodied as a speaker, a vibrator, and/or an optical output device.

The air control device 500 can control the air condition of the first area (indoor area) in response to a control signal (CS) received from the third communication module 450.

For example, the air control device 500 can be embodied as an air conditioner, an air washer, a humidifier, a dehumidifier, an air cleaner, a heater, a cooler, conditioning equipment, and/or a smart door.

According to an embodiment of the present disclosure, when the air control device 500 is an air conditioner, the air control device 500 can output cold air to the first area. When the air control device 500 is an air cleaner, the air control device 500 can output purified air to the first area. Also, when the air control device 500 is a smart door, the air control device 500 can open or close the door to control the air condition of the first area.

The air control device 500 can transmit operation information (OI) to the third communication module 450. Also, the air control device 500 can transmit operation termination information (TI) to the third communication module 450.

The operation information (OI) can indicate information associated with a state in which the air control device 500 is operated.

For example, the operation information (OI) can include an operation time and an operation condition (e.g., a set temperature, a set humidity, and/or an air cleaning level), and the like.

The operation termination information (TI) can indicate information associated with a state in which the operation of the air control device 500 is terminated.

For example, the operation termination information (TI) can include an operation termination time and an operation termination condition (e.g., a set temperature, a set humidity, and/or an air cleaning level), and the like.

The air control device 500 can transmit sensing information to the third communication module 450. In this instance, the sensing information can indicate information associated with the air condition sensed by a sensor included in the air control device 500.

Figure 5:
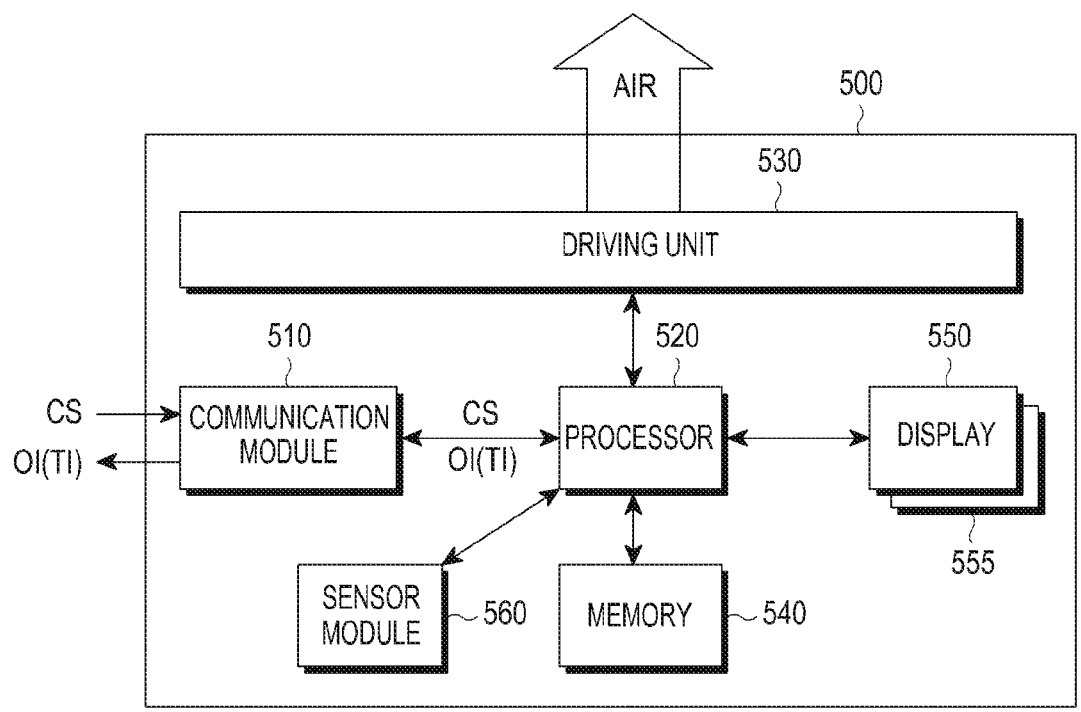
FIG. 5 schematically illustrates an air control device according to various embodiments of the present disclosure.

FIG. 5 is a block diagram schematically illustrating an air control device according to various embodiments of the present disclosure.

Referring to FIGS. 4 and 5, the air control device 500 includes a communication module 510, a processor 520, a driving unit 530, a memory 540, a display 550, and a sensor module 560.

The communication module 510 can receive a control signal (CS) from the electronic device 401. The communication module 510 can transmit a control signal (CS) to the processor 520.

The communication module 510 can transmit operation information (OI) to the electronic device 401. Also, the communication module 510 can transmit operation termination information (TI) to the electronic device 401.

The processor 520 can control general operations of the air control device 500.

According to an embodiment of the present disclosure, the processor 520 can control the air condition of a first area in response to a control signal (CS) transmitted from the electronic device 401.

For example, the processor 520 can output air (e.g., cold air, warm air, and/or purified air) through the driving unit 530 in response to the control signal (CS). Also, when the air control device 500 is a smart door, the processor 520 can open or close the door through the driving unit 530, in response to the control signal (CS).

The driving unit 530 can output air to the first area under the control of the processor 520. For example, when the air control device 500 is an air conditioner, the driving unit outputs cold air to the first area. Also, when the air control device 500 is an air cleaner, the driving unit outputs purified air to the first area.

Also, when the air control device 500 is a smart door, the driving unit 530 can open or close the door under the control of the processor 520.

The memory 540 can store the operation information (OI) and the operation termination information (TI) of the air control device 500. For example, the memory 540 can be embodied as a non-volatile memory.

The display 550 can display an operation state of the air control device 500.

The display 550 can include a touch screen 555. For example, the touch screen 555 can be embodied to be in contact with a display. The touch screen 555 can receive an operation command and an operation termination command from a user.

The sensor module 560 can sense the air condition around the air control device 500. The sensor module 560 can transmit sensing information to the processor 520.

According to an embodiment of the present disclosure, the sensor module 560 can be one of the plurality of first sensors 480. For example, the processor 520 can transmit, to the electronic device 401, sensing information transmitted from the sensor module 560.

Figure 6:
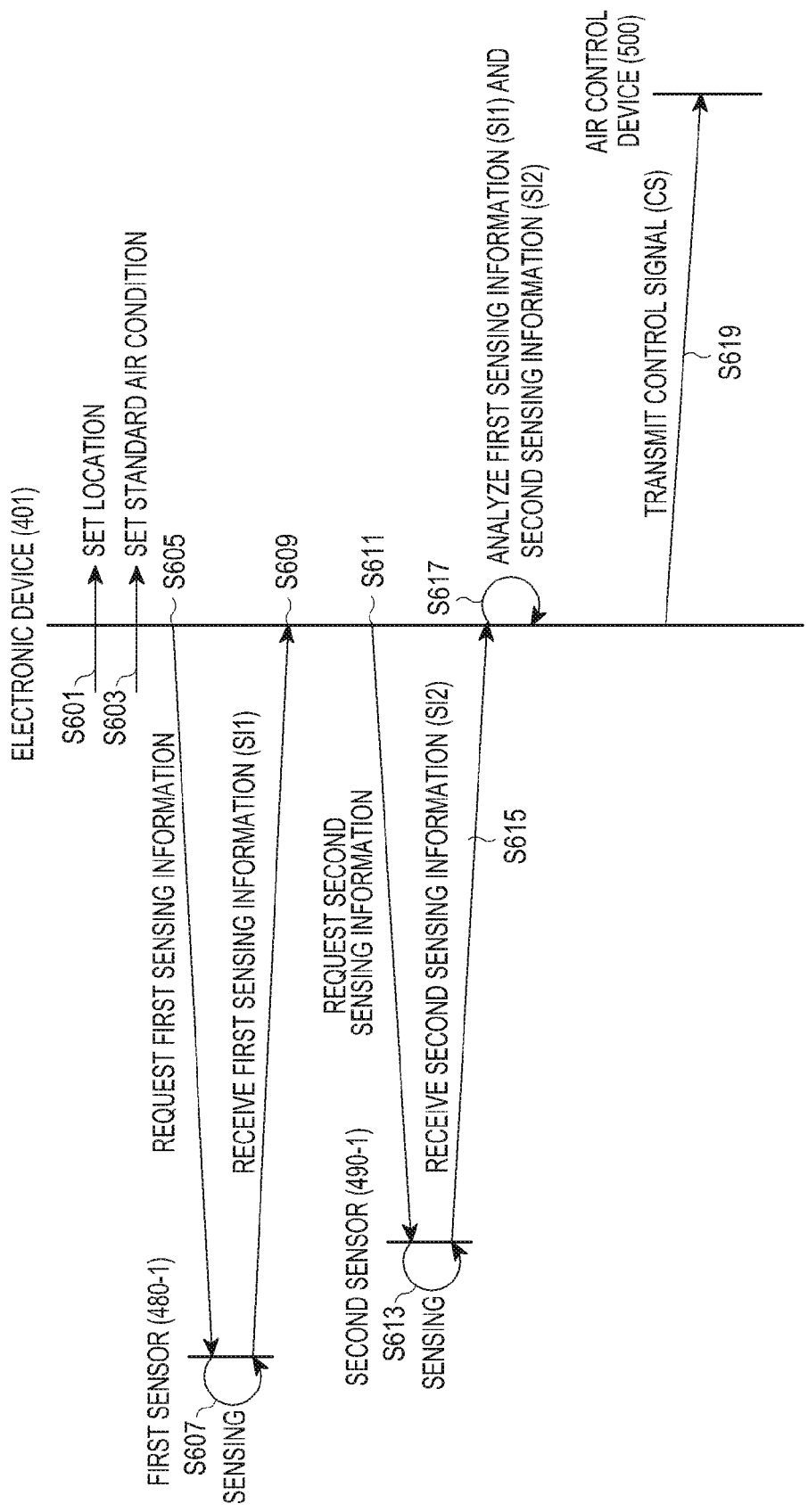
FIG. 6 is a data flow illustrating operations of an electronic device according to various embodiments of the present disclosure.

FIG. 6 is a data flow illustrating operations of an electronic device according to various embodiments of the present disclosure.

Referring to FIGS. 4 to 6, the processor 430 sets a location of the electronic device 401 in operation S601. For example, the processor 430 can set the location of the electronic device 401 using a GPU module 465.

The processor 430 sets a standard air condition in operation S603. In this instance, the standard air condition can be set by a user or can be automatically set by the processor 430.

The processor 430 requests first sensing information (SI1) from at least one first sensor 480-1 out of the plurality of first sensors 480 that are located in the first area in operation S605.

The at least one first sensor 480-1 senses the ambient air condition in operation S607.

The processor 430 receives first sensing information (SI1) from at least one first sensor 480-1 out of the plurality of first sensors 480 in operation S609.

The processor 430 requests second sensing information (SI2) from at least one second sensor 490-1 out of the plurality of second sensors 490 that are located in a second area in operation S611.

According to an embodiment of the present disclosure, the processor 430 compares location information (L1) associated with the plurality of second sensors 490 stored in the memory 440 and the location of the electronic device 401, and selects, as the second sensor 490-1, a sensor that is the closest to the electronic device 401 out of the plurality of second sensors 490. Also, the processor 430 can select sensors that are close to the electronic device 401 out of the plurality of second sensors 490.

The at least one second sensor 490-1 senses the ambient air condition in operation S613.

The processor 430 receives second sensing information (SI2) from at least one second sensor 490-1 out of the plurality of second sensors 490 in operation S615.

According to an embodiment of the present disclosure, the sequence that the processor 430 performs the operation of receiving the first sensing information (SI1) from the first sensor 480-1 and the operation of receiving the second sensing information (SI2) from the second sensor 490-1 may not be limited thereto. For example, the processor 430 can receive the second sensing information (SI2) before the first sensing information (SI1), and can simultaneously receive the first sensing information (SI1) and the second sensing information (SI2).

The processor 430 receives the first sensing information (SI1) and the second sensing information (SI2) in operation S617. According to an embodiment of the present disclosure, the processor 430 can determine the air condition around the electronic device 401 based on the first sensing information (SI1) and the second sensing information (SI2).

Based on the analysis result, the processor 430 generates a control signal (CS), and transmits the control signal (CS) to the air control device 500 in operation S619. According to an embodiment of the present disclosure, the processor 430 controls the air control device 500 based on the determined air condition, and controls the air condition around the electronic device 401. For example, the processor 430 can control the air condition around the electronic device 401 based on a standard air condition.

Figure 7:
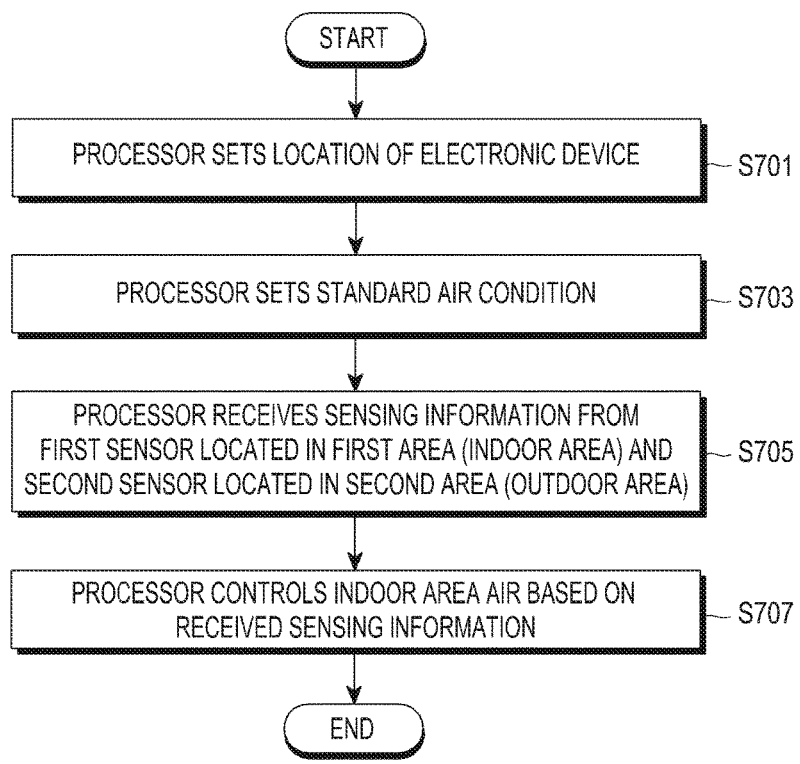
FIG. 7 is a flowchart illustrating operations of an electronic device according to various embodiments of the present disclosure.

FIG. 7 is a flowchart illustrating operations of an electronic device according to various embodiments of the present disclosure.

Referring to FIGS. 4 to 7, the processor 430 sets a location of the electronic device 401 in operation S701. For example, the processor 430 can set the location of the electronic device 401 using a GPS signal.

The processor 430 sets a standard air condition in operation S203. According to an embodiment of the present disclosure, the processor 430 can control the air condition of a first area based on the standard air condition.

The processor 430 receives a first sensing signal (SI1) from the first sensor 480-1 located in the first area in operation S705. Also, the processor 430 receives a second sensing signal (SI2) from the second sensor 490-1 located in the second area in operation S705.

The processor 430 controls the air condition (or air) of the first area based on the first sensing signal (SI1) and the second sensing signal (SI2) in operation S707. According to an embodiment of the present disclosure, the processor 430 searches for the air control device 500 located in the first area, and transmits a control signal (CS) to the retrieved air control device 500.

Figures 8, 9:
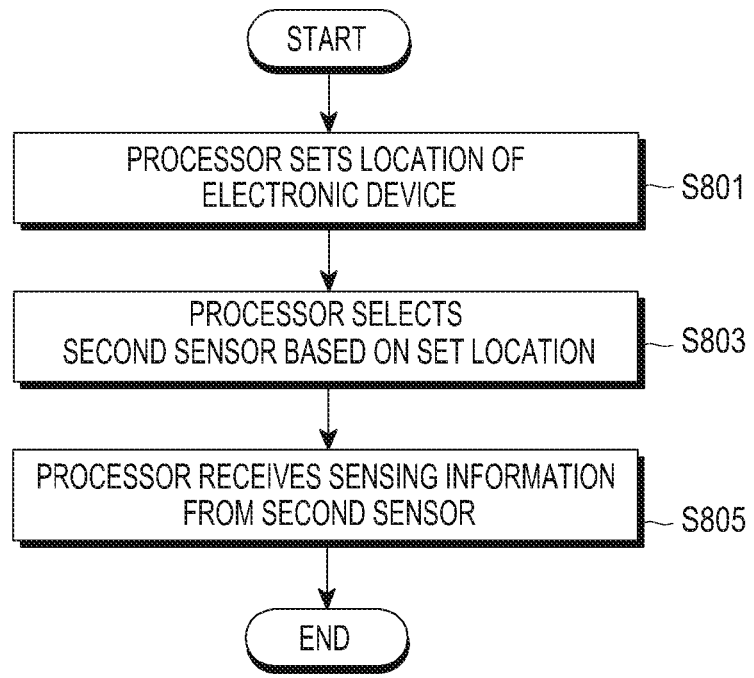
FIG. 8 is a flowchart illustrating operations of an electronic device according to various embodiments of the present disclosure.
FIG. 9 is a diagram illustrating location information of a second sensor according to various embodiments of the present disclosure.

FIG. 8 is a flowchart illustrating operations of an electronic device according to various embodiments of the present disclosure.

Referring to FIGS. 4 to 8, the processor 430 sets a location of the electronic device 401 in operation S801.

The processor 430 selects the second sensor 490-1 based on the location of the electronic device 401 in operation S803.

According to an embodiment of the present disclosure, the processor 430 compares location information (L1) associated with the plurality of second sensors 490 stored in the memory 440 with the location of the electronic device 401, and selects, as the second sensor 490-1, a sensor that is the closest to the electronic device 401 out of the plurality of second sensors 490. Also, the processor 430 can select sensors that are close to the electronic device 401 out of the plurality of second sensors 490.

The at least one second sensor 490-1 to 490-n, which is selected by the processor 430, can sense the ambient air condition.

The processor 430 can receive second sensing information (SI2) from the at least one second sensor 490-1 to 490-n.

FIG. 9 is a diagram illustrating location information of a second sensor according to various embodiments of the present disclosure.

Referring to FIGS. 4 to 9, the electronic device 401 can store location information (L1) of the plurality of second sensors 490 in the memory 440.

For example, the location information (L1) can include a sensor name, a type of sensor, and information associated with the location of a sensor, in association with each of the plurality of second sensors 490.

For example, according to the location information (L1) of any one 490-1 out of the plurality of second sensors 490, the sensor name can be sensor 2-1, the type of sensor can be a temperature sensor, and the location of the sensor can be a first point. The sensor name of another sensor 490-2 out of the plurality of second sensors 490 can be sensor 2-2, the type of sensor can be a humidity sensor, and the location of the sensor can be a second point. Also, the sensor name of another sensor 490-3 out of the plurality of second sensors 490 can be sensor 2-3, the type of sensor can be a pollution level sensor, and the location of the sensor can be a third point. In the same manner, the plurality of second sensors 490 can further include sensor 2-4 and sensor 2-5. In this instance, the first point, the second point, the third point, a fourth point, and a fifth point can be the same as one another, or can be different from each other.

Also, each of the plurality of second sensors 490 can be embodied as a compound sensor that is capable of sensing temperature, humidity, an air pollution level, ultraviolet ray, and/or harmful gas. That is, each of the plurality of second sensors 490 can be embodied as an individual sensor that is capable of sensing one of temperature, humidity, air cleanliness, ultraviolet ray, and harmful gas, or can be embodied as a compound sensor that is capable of sensing at least one out of temperature, humidity, air cleanliness, ultraviolet ray, and harmful gas.

In the same manner, each of the plurality of first sensors 490 can be embodied as a compound sensor that is capable of sensing temperature, humidity, an air pollution level, ultraviolet ray, and harmful gas. That is, each of the plurality of first sensors 490 can be embodied as an individual sensor that is capable of sensing one of temperature, humidity, air cleanliness, ultraviolet ray, and harmful gas, or can be embodied as a compound sensor that is capable of sensing at least one out of temperature, humidity, air cleanliness, ultraviolet ray, and harmful gas.

According to an embodiment of the present disclosure, the location information (L1) can be stored in the memory 440 by a manufacturer in the process of manufacturing the electronic device 401. Also, the location information (L1) can be stored in the memory 440 in the process of initializing the electronic device 401.

According to another embodiment of the present disclosure, the location information (L1) can be updated by a user or the processor 430. In this instance, the updated location information can be stored in the memory 440.

Also, the processor 430 can obtain the location information (L1) based on the strength of a signal received from the plurality of second sensors 490. In this instance, the processor 430 can store the obtained location information (L1) in the memory 440.

For ease of description, the location information (L1) illustrated in FIG. 9 is an example of the location information (L1) of the plurality of second sensors 490, and the configuration of the location information (L1), the number of pieces of location information (L1), and/or the type of location information (L1) may not be limited thereto.

Figure 10:
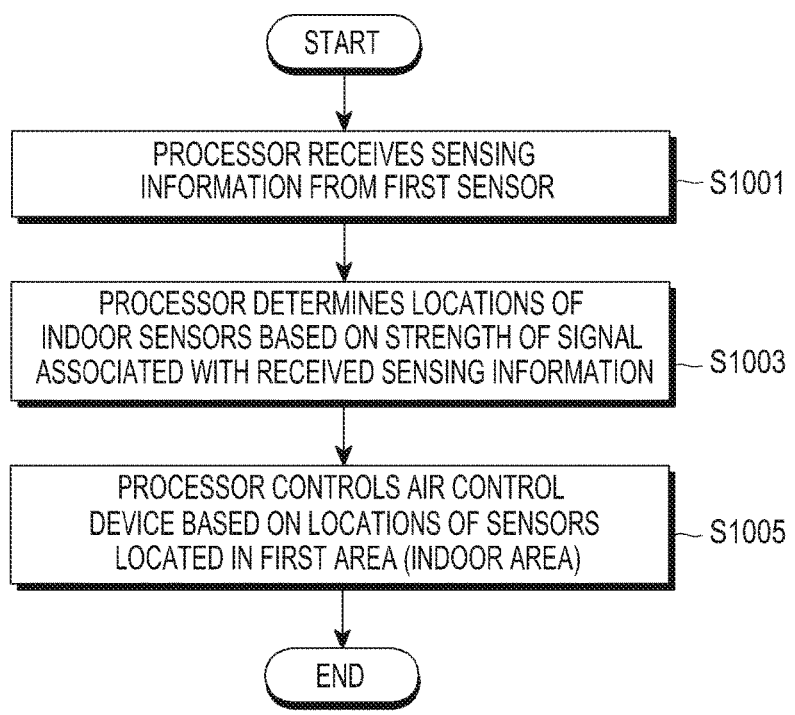
FIG. 10 is a flowchart illustrating operations of an electronic device according to various embodiments of the present disclosure.

FIG. 10 is a flowchart illustrating operations of an electronic device according to various embodiments of the present disclosure.

Referring to FIGS. 4 to 10, the processor 430 receives first sensing information (SI1) from at least one first sensor 480-1 in operation S1001.

The processor 430 determines the location of at least one first sensor 480-1 to 480-m, which is located in a first area, based on a signal strength associated with the first sensing information (SI1) in operation S1003.

According to an embodiment of the present disclosure, the processor 430 can determine the signal strength associated with sensing information that is received through the first communication module 410 from at least one first sensor 480-1 to 480-*m*. The processor 430 determines the location of the at least one first sensor 480-1 to 480-*m*, based on the signal strength.

The processor 430 controls the air control device 500 based on the location of sensors located in the first area in operation S1005.

For example, the processor 430 determines the location of the first sensor 480-1 out of the plurality of first sensors 480, and controls at least one air control device around the first sensor 480-1. Also, the processor 430 determines the location of another first sensor 480-2 out of the plurality of first sensors 480, and controls at least one air control device around the other first sensor 480-2.

For example, when the outdoor air is cleaner than the indoor air, the processor 430 does not operate an air cleaner, and can open a smart door. Also, when the outdoor fine dust concentration is currently high, the processor 430 can close the smart door and can operate the air cleaner.

For example, in the case in which the outdoor temperature is lower than the indoor temperature, the processor 430 can open the smart door when it is summer. Conversely, when it is winter, the processor 430 can close the smart door.

According to an embodiment of the present disclosure, the processor 430 compares a standard value with a current condition of the first area in association with temperature, humidity, a fine dust concentration, a harmful gas concentration, and/or an ultraviolet ray index, and controls the air control device 500 based on a comparison result. In this instance, the standard value indicates a predetermined value, and the standard value can be a body permissible limit provided from a public institute.

Figure 11:
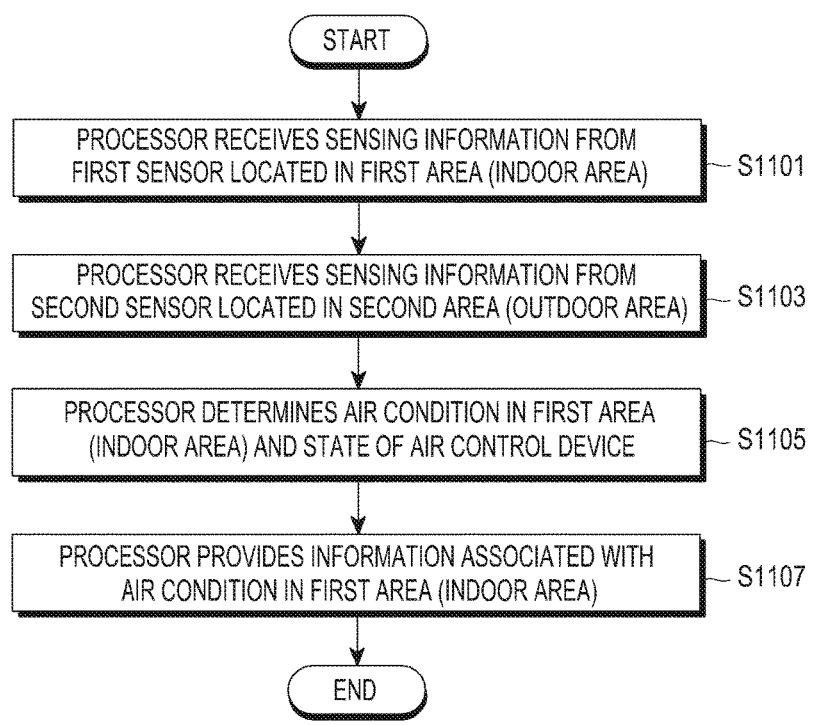
FIG. 11 is a flowchart illustrating operations of an electronic device according to various embodiments of the present disclosure.

FIG. 11 is a flowchart illustrating operations of an electronic device according to various embodiments of the present disclosure.

Referring to FIGS. 4 to 11, the processor 430 receives first sensing information (SI1) from the first sensor 480-1 located in a first area in operation S1101.

The processor 430 receives second sensing information (SI2) from the second sensor 490-1 located in a second area in operation S1103.

The processor 430 determines the air condition of the first area in operation S1105. According to an embodiment of the present disclosure, the processor 430 can determine the air condition of the first area based on the first sensing information (SI1) and the second sensing information (SI2).

For example, the processor 430 can determine the condition of the first area in association with temperature, humidity, a fine dust concentration, a harmful gas concentration, and/or an ultraviolet ray index. Also, the processor 430 can determine the condition of a second area in association with temperature, humidity, a fine dust concentration, a harmful gas concentration, and/or an ultraviolet ray index.

The processor 430 determines the state of the air control device in operation S1105. For example, the processor 430 can determine whether the air control device 500 is operated. Also, when the air control device 500 is operated, the processor 430 can determine an operation state. In this instance, the operation state can indicate an operation time, an operation condition, and/or the frequency of operation of the air control device 500.

The processor 430 provides information associated with the air condition of the first area in operation S1107. Also, the processor 430 provides information associated with the air condition of the second area.

According to an embodiment of the present disclosure, the processor 430 provides information associated with the air condition of the first area and/or information associated with the air condition of the second area, through the display 470.

The processor 430 provides information associated with the state of the air control device 500 in the first area. In this instance, the information associated with the state of the air control device 500 includes whether the air control device 500 is operated, a type of air control device that is used, a time when the air control device 500 is used, and a condition where the air control device 500 is used, and the like.

According to an embodiment of the present disclosure, the processor 430 can provide a user with a guide to air condition improvement.

For example, when the outdoor air is currently cleaner than the indoor air, the processor 430 can provide guidance that indicates opening door rather than operating an air cleaner. Also, when the outdoor fine dust concentration is currently high, the processor 430 can provide guidance that indicates closing the smart door and operating the air cleaner.

For example, in the case in which the outdoor temperature is lower than the current indoor temperature, the processor 430 can provide guidance that indicates opening the smart door when it is summer. Conversely, when it is winter, the processor 430 can provide guidance that indicates closing the door.

According to an embodiment of the present disclosure, the processor 430 can provide a user with a standard value and the current condition of the first area in association with temperature, humidity, a fine dust concentration, a harmful gas concentration, and/or an ultraviolet ray index. In this instance, the standard value indicates a predetermined value, and the standard value can be a body permissible limit provided from a public institute.

Also, the processor 430 can provide a user with a standard value and the current condition of a second area in association with temperature, humidity, a fine dust concentration, a harmful gas concentration, and/or an ultraviolet ray index.

According to another embodiment of the present disclosure, the processor 430 can determine a change in the air condition of the first area. Also, the processor 430 can determine a change in the air condition of the second area.

For example, the processor 430 can determine the change in the air condition of the first area, and can provide information associated with the change in the air condition based on a determination result. Also, the processor 430 can determine the change in the air condition of the second area, and can provide information associated with the change in the air condition based on a determination result.

The processor 430 can provide an alarm in association with a change in the air condition. In this instance, the alarm can be provided through sound, vibration, image pop-up and/or the outputting of a light source.

For example, when a change in the condition of the first area in association with temperature, humidity, a fine dust concentration, a harmful gas concentration, and/or an ultraviolet ray index exceeds a predetermined standard value, the processor 430 can provide a user with an alarm.

According to another embodiment of the present disclosure, the processor 430 provides information associated with the air condition of the first area to a portable terminal registered in the electronic device 401. Also, the processor 430 provides information associated with a change in the air condition of the first area to the portable terminal registered in the electronic device 401.

Figure 12:
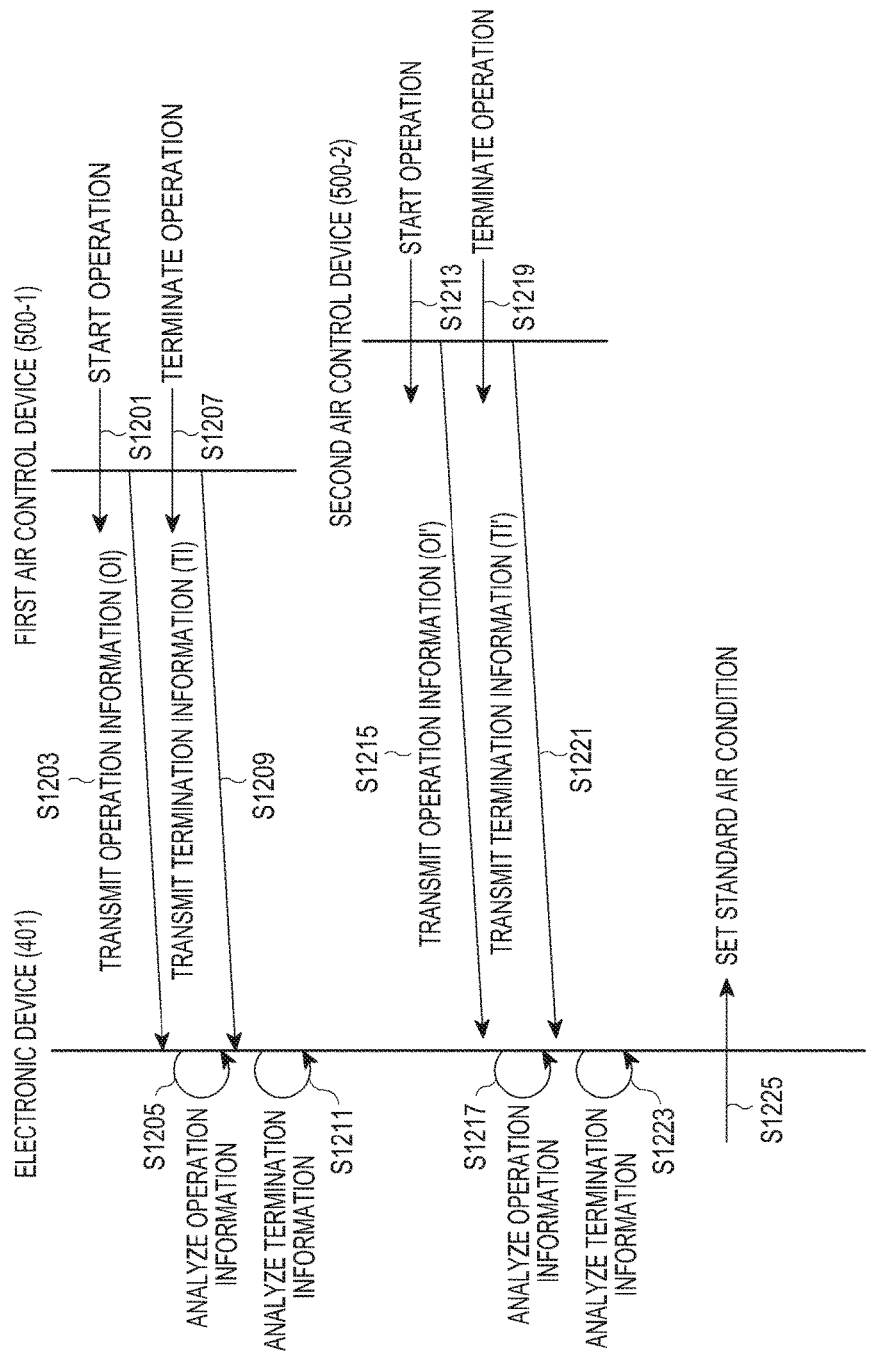
FIG. 12 is a data flow illustrating an operation in which an electronic device sets a standard air condition according to various embodiments of the present disclosure.

FIG. 12 is a data flow illustrating an operation in which an electronic device sets a reference air condition according to various embodiments of the present disclosure.

Referring to FIGS. 4 to 12, a first area includes at least one air control device 500-1 to 500-2. In this instance, at least one air control device 500-1 and 500-2 can be embodied to be substantially the same as, or similar to, the air control device 500.

According to an embodiment of the present disclosure, the processor 430 can control the at least one air control device 500-1 and 500-2. Also, the processor 430 can receive information associated with an operation from the at least one air control device 500-1 and 500-2.

The first air control device 500-1 located in the first area can start operation in operation S1201. In this instance, the first air control device 500-1 can start operation by the electronic device 401 or a user.

When the first air control device 500-1 starts operation, the first air control device 500-1 transmits operation information (OI) to the electronic device 401 in operation S1203.

The electronic device 401 analyzes a usage pattern of the first air control device 500-1 based on the received operation information (OI) in operation S1205.

For example, the usage pattern can include the type of air control device, information associated with whether it is used, a time when it is used, a condition where is it used, and/or a place where it is used.

The first air control device 500-1 located in the first area terminates operation in operation S1207. In this instance, the first air control device 500-1 can terminate operation by the electronic device 401 or a user.

When the first air control device 500-1 terminates operation, the first air control device 500-1 transmits operation termination information (TI) to the electronic device 401 in operation S1209.

The electronic device 401 analyzes a usage pattern of the first air control device 500-1 based on the operation termination information (TI) in operation S1211.

According to an embodiment of the present disclosure, the electronic device 401 determines the usage pattern of the first air control device 500-1 based on the operation information (OI) and the operation termination information (TI).

According to another embodiment of the present disclosure, the electronic device 401 determines the usage pattern of the first air control device 500-1 based on the operation information (OI) or the operation termination information (TI).

The electronic device 401 sets a standard air condition associated with the first air control device 500-1 based on the determined usage pattern. Also, the electronic device 401 controls the first air control device 500-1 based on the set standard air condition.

The second air control device 500-2 located in the first area can start operation in operation S1213. In this instance, the second air control device 500-2 can start operation by the electronic device 401 or a user.

The second air control device 500-2 can be located in an area that is different from, or close to, the area where the first air control device 500-1 is located. Also, the second air control device 500-2 can be embodied as a homogeneous or heterogeneous air control device of the first air control device 500-1. In this instance, the different area indicates an area that is distinguished from the first area by a wall or a cell.

For example, when the first air control device 500-1 and the second air control device 500-2 are located in neighbor areas, the first air control device 500-1 and the second air control device 500-2 can be embodied as heterogeneous air control devices. Also, when the first air control device 500-1 and the second air control device 500-2 are located in different areas, the first air control device 500-1 and the second air control device 500-2 can be embodied as homogeneous or heterogeneous air control devices.

When the second air control device 500-2 starts operation, the second air control device 500-2 transmits operation information (OI') to the electronic device 401 in operation S1215.

The electronic device 401 analyzes a usage pattern of the second air control device 500-2 based on the received operation information (OI') in operation S1217.

The second air control device 500-2 located in the first area terminates operation in operation S1219. In this instance, the second air control device 500-2 can terminate operation by the electronic device 401 or a user.

When the second air control device 500-2 terminates operation, the second air control device 500-2 transmits operation termination information (TI') to the electronic device 401 in operation S1221.

The electronic device 401 analyzes a usage pattern of the second air control device 500-2 based on the received operation termination information (TI') in operation S1223.

According to an embodiment of the present disclosure, the electronic device 401 determines the usage pattern of the second air control device 500-2 based on the operation information (OI') and the operation termination information (TI').

According to another embodiment of the present disclosure, the electronic device 401 determines the usage pattern of the second air control device 500-2 based on the operation information (OI') and the operation termination information (TI').

The electronic device 401 sets a standard air condition associated with the second air control device 500-2 based on the determined usage pattern. Also, the electronic device 401 controls the second air control device 500-2 based on the set standard air condition.

According to an embodiment of the present disclosure, the electronic device 401 sets a standard air condition based on the usage pattern of the first air control device 500-1 and the usage pattern of the second air control device 500-2 in operation S1225. In this instance, the standard air condition indicates a standard air condition associated with the first area.

For example, when an air conditioner is operated in a light wind mode at 7 o'clock in the morning, and an air cleaner is operated in a strong mode at 7:30 A.M., the processor 430 can receive operation information (OI) of the air conditioner and the operation information (OI') of the air cleaner.

Also, when the air conditioner is operated in a strong wind mode at 8 o'clock in the evening, and the air cleaner is operated at 10 o'clock in the evening, the processor 430 can receive operation information (OI) of the air conditioner and the operation information (OI') of the air cleaner. Also, when the air conditioner terminates operation at 9 o'clock in the evening, and the air cleaner terminates operation at 11 o'clock in the evening, the processor 430 can receive operation termination information (TI) of the air conditioner and the operation termination information (TI') of the air cleaner.

The processor 430 sets the standard air condition based on the received operation information (OI and OI') and/or operation termination information (TI and TI').

Figure 13:
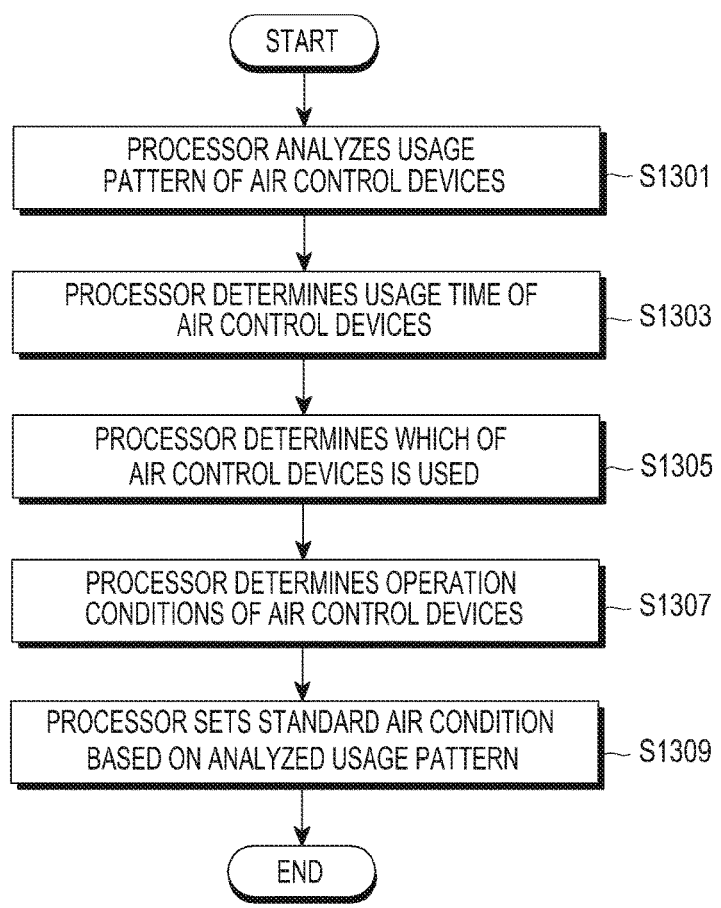
FIG. 13 is a flowchart illustrating an operation in which an electronic device sets a standard air condition according to various embodiments of the present disclosure.

FIG. 13 is a flowchart illustrating an operation in which an electronic device sets a standard air condition according to various embodiments of the present disclosure.

Referring to FIGS. 4 to 13, the processor 430 analyzes the usage pattern of at least one air control device 500, 500-1, and/or 500-2 that is located in a first area.

According to an embodiment of the present disclosure, the processor 430 determines the usage pattern based on the type of at least one air control device 500, 500-1, and/or 500-2, an operation time, an operation condition, an operation place, and/or information associated with whether it is operated.

According to an embodiment of the present disclosure, the processor 430 determines the operation time of the at least one air control device 500, 500-1, and/or 500-2 in operation S1303.

The processor 430 determines whether the at least one air control device 500, 500-1, and/or 500-2 is operated in operation S1305. For example, the processor 430 determines which of the at least one air control device 500, 500-1, and/or 500-2 that is located in the first area is operated.

When at least one air control device 500, 500-1, and/or 500-2 is operated, the processor 430 determines the operation condition of the at least one air control device 500, 500-1, and/or 500-2 in operation S1307. In this instance, the operation condition includes information associated with the strength, the output mode, and/or the output direction of output air.

Also, the processor 430 determines the operation place whether the at least one air control device 500, 500-1 and/or 500-2 is operated.

The processor 430 sets a standard air condition based on the analyzed usage pattern in operation S1309. Also, the processor 440 can store the set standard air condition in the memory 440.

The processor 430 can update the standard air condition in real time or periodically. In this instance, when the standard air condition is set by a user, the processor 430 may not automatically update the standard air condition.

Figure 14:
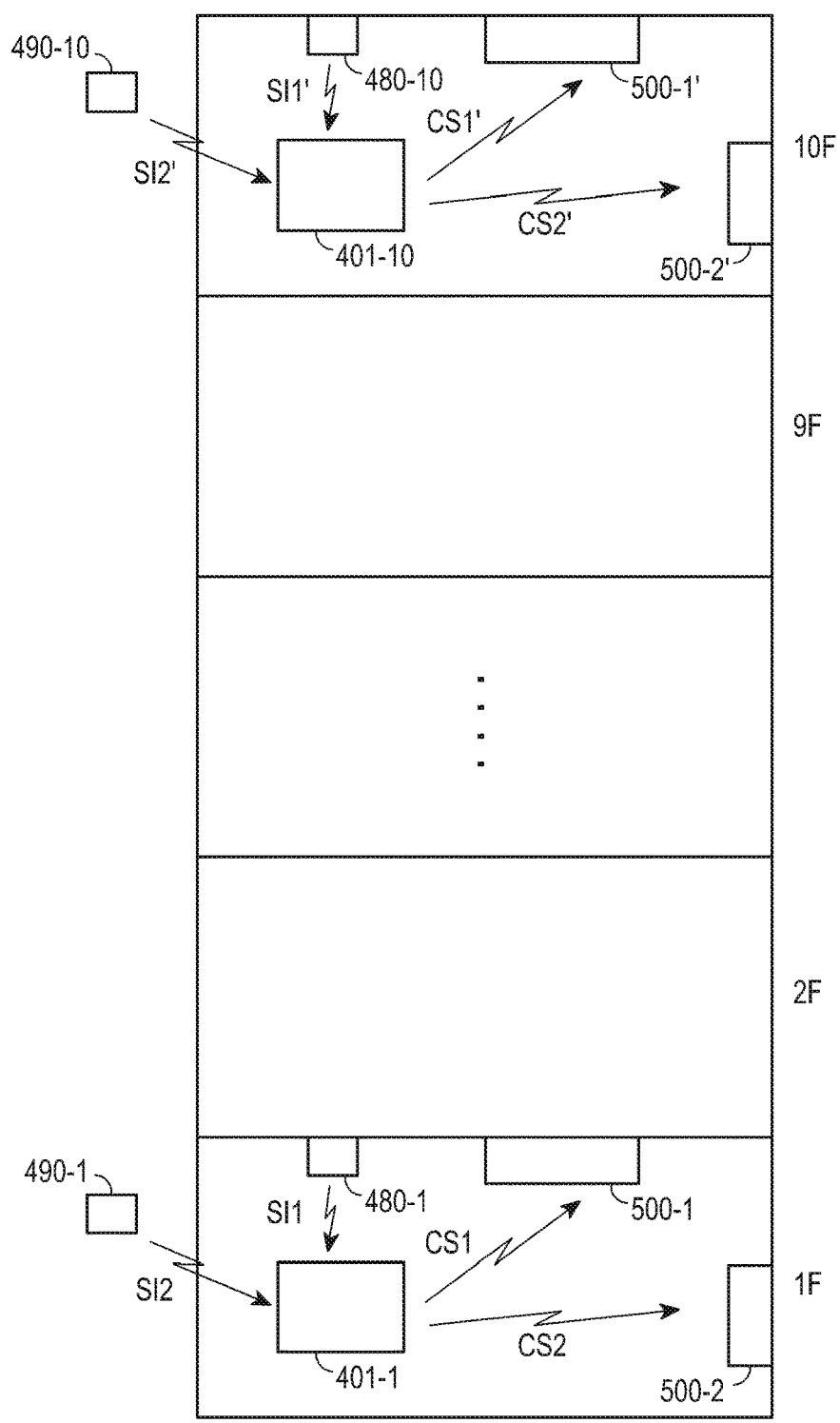
FIG. 14 illustrates an air control system according to various embodiments of the present disclosure.

FIG. 14 is a block diagram illustrating an air control system according to various embodiments of the present disclosure.

Referring to FIGS. 4 to 14, an air control system 400-1 may be embodied to be substantially the same as, or similar to, the air control system 400 that has been described in FIG. 4. The air control system 400-1 may indicate the air control system 400 applied to a building (or a structure).

A first electronic device 401-1 and a second electronic device 401-10 can be embodied to be substantially the same as, or similar to, the electronic device 401. For example, the first electronic device 401-1 indicates an electronic device installed in the first floor of a building, and the second electronic device 401-10 indicates an electronic device installed in the tenth floor of the building.

According to an embodiment of the present disclosure, the first electronic device 401-1 can receive first sensing information (SI1) from the first sensor 480-1 of the first floor of the building. Also, the first electronic device 401-1 can receive second sensing information (SI2) from the second sensor 490-1 that is close to the first floor of the building out of the plurality of second sensors 490.

The first electronic device 401-1 can control the first air control device 500-1 and the second air control device 500-2 based on the first sensing information (SI1) and the second sensing information (SI2). For example, the first electronic device 401-1 can transmit a first control signal (CS1) to the first air control device 500-1, and can transmit a second control signal (CS2) to the second air control device 500-2.

According to an embodiment of the present disclosure, the second electronic device 401-10 can receive first sensing information (SI1') from the first sensor 480-10 of the tenth floor of the building. Also, the first electronic device 401-1 can receive second sensing information (SI2') from a second sensor 490-10 that is close to the tenth floor of the building out of the plurality of second sensors 490.

The second electronic device 401-10 can control a first air control device 500-1' and a second air control device 500-2' based on the first sensing information (SI1') and the second sensing information (SI2'). For example, the second electronic device 401-10 can transmit a first control signal (CS1') to the first air control device 500-1' and can transmit a second control signal (CS2') to the second air control device 500-2'.

That is, the sensing information transmitted from a second sensor that operates in conjunction with the space of the first floor of the building can be different from the sensing information that is transmitted from a second sensor that operates in conjunction with the space of the tenth floor of the building. Therefore, the first electronic device 401-1 selects the second sensor 490-1 that is close to the first floor of the building and receives the sensing information SI2, and the second electronic device 401-10 selects the second sensor that is close to the tenth floor of the building and receives the sensing information (SI2').

Figure 15:
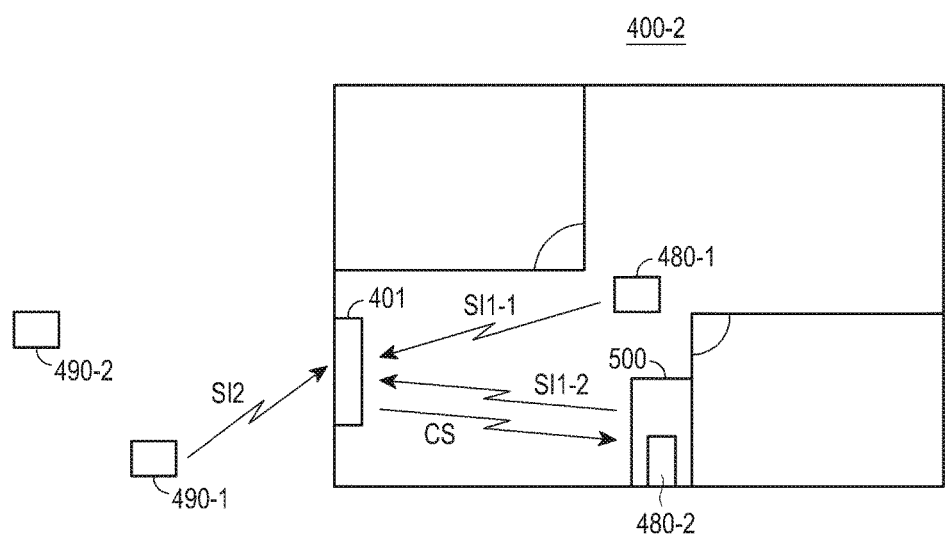
FIG. 15 illustrates an air control system according to various embodiments of the present disclosure.

FIG. 15 is a block diagram illustrating an air control system according to various embodiments of the present disclosure.

Referring to FIGS. 4 to 15, the air control system 400-2 can be embodied to be substantially the same as, or similar to, the air control system 400 that has been described in FIG. 4. The air control system 400-2 can indicate the air control system 400 applied to a house or an office.

The electronic device 401 can receive first sensing information (SI1-1 and SI1-2) from the plurality of first sensors 480-1 and 480-2 located in a first area. For example, one 480-2 of the plurality of first sensors can be attached to, or included in, the air control device 500.

The electronic device 401 selects the second sensor 490-1 that is close to the electronic device 401, out of the plurality of second sensors 490-1 and 490-2 located in a second area, and receives second sensing information (SI2) from the selected second sensor 490-1. In this instance, the electronic device 401 may not select the second sensor 490-2 that is not close to the electronic device 401, out of the plurality of second sensors 490-1 and 490-2. That is, the electronic device 401 may not receive a second sensing signal from the second sensor 490-2 that is not close to the electronic device 401, out of the plurality of second sensors 490-1 and 490-2.

For example, the processor 430 can select the second sensor 490-1 that is close to the electronic device 401 based on the location information (L1) of the plurality of second sensors 490-1 and 490-2 stored in the memory 440.

Figure 16:
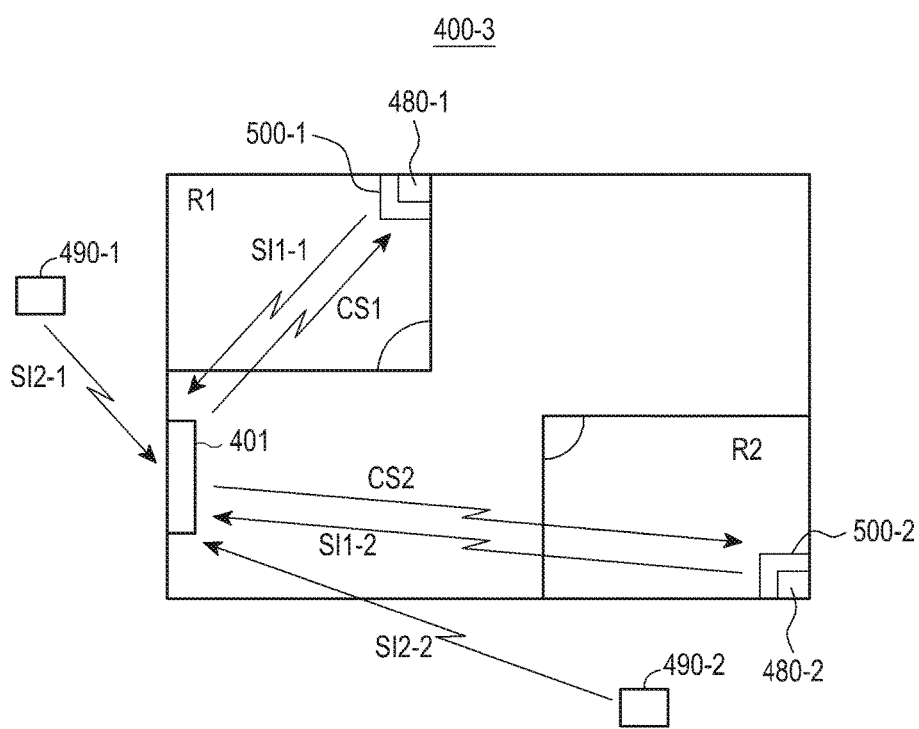
FIG. 16 illustrates an air control system according to various embodiments of the present disclosure.

FIG. 16 is a block diagram illustrating an air control system according to various embodiments of the present disclosure.

Referring to FIGS. 4 to 16, an air control system 400-3 can be embodied to be substantially the same as, or similar to, the air control system 400 that has been described in FIG. 4. The air control system 400-2 can indicate the air control system 400 applied to a house or an office.

Also, the first air control device 500-1 and the second air control device 500-2 can be embodied to be substantially the same as, or similar to, the air control device 500 that has been described in FIG. 4.

The electronic device 401 can receive first sensing information (SI1-1 and SI1-2) from a plurality of first sensors 480-1 and 480-2 located in a first area. For example, the plurality of first sensors 480-1 and 480-2 can be respectively attached to, or included in, the air control devices 500-1 and 500-2.

A first control signal (CS1) is a signal to control the first air control device 500-1, and a second control signal (CS2) is a signal to control the second air control device 500-2.

The electronic device 401 can receive a second sensing signal (SI2-1 and SI2-2) from the plurality of second sensors 490-1 and 490-2 located in a second area. For example, the plurality of second sensors 490-1 and 490-2 can be located to be close to the electronic device 401.

For example, the processor 430 can select the second sensor 490-1 and 490-2 that is close to the electronic device 401 based on the location information (L1) of the plurality of second sensors 490-1 and 490-2 stored in the memory 440.

According to an embodiment of the present disclosure, the first area includes a first space (R1) and a second space (R2). For example, the first space (R1) and the second space (R2) can indicate a room or an office that is distinguished by a wall or a cell.

According to an embodiment of the present disclosure, the electronic device 401 can control the air condition of the first space (R1) and the air condition of the second space (R2) in the first area.

The electronic device 401 can control the air condition of the first space (R1) based on the first air control device 500-1. For example, the electronic device 401 can receive first sensing information (SI1-1) from the first sensor 480-1 that is close to the first space (R1). Also, the electronic device 401 can receive second sensing information (SI2-1) from the second sensor 490-1 that is close to the first space (R1).

The electronic device 401 can transmit a first control signal (CS1) to the first air control device 500-1 based on the first sensing information (SI1-1) and the second sensing information (SI2-1).

The electronic device 401 can control the air condition of the second space (R2) based on the second air control device 500-2. For example, the electronic device 401 can receive first sensing information (SI1-2) from the first sensor 480-2 that is close to the second space (R2). Also, the electronic device 401 can receive second sensing information (SI2-2) from the second sensor 490-2 that is close to the second space (R2).

The electronic device 401 can transmit a second control signal (CS1) to the second air control device 500-2 based on the first sensing information (SI1-2) and the second sensing information (SI2-2).

Figure 17:
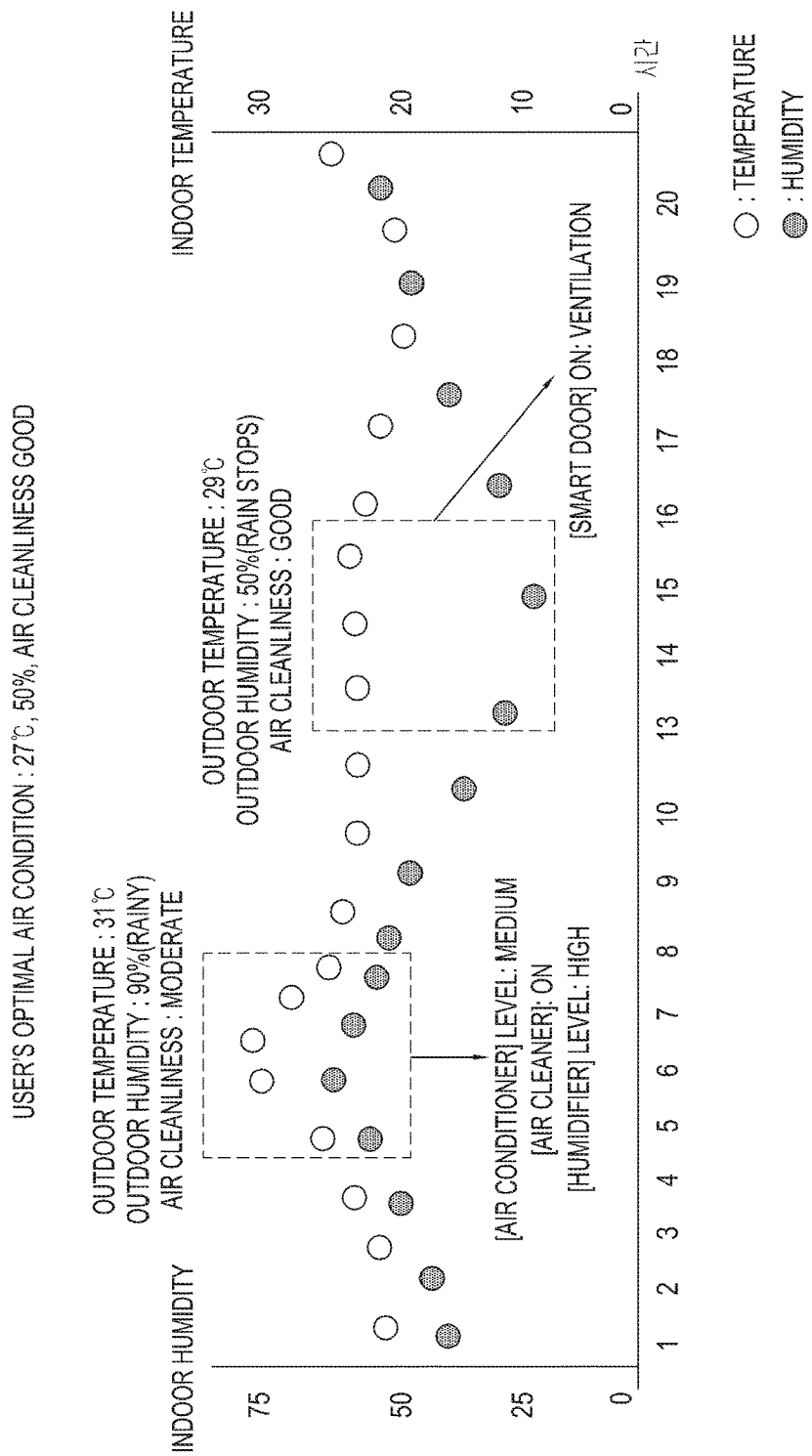
FIG. 17 is a graph illustrating operations of an electronic device according to various embodiments of the present disclosure.

FIG. 17 is a graph illustrating operations of an electronic device according to various embodiments of the present disclosure.

Referring to FIGS. 1 to 17, the processor 430 can measure the indoor temperature and the indoor humidity based on sensing information (SI1) received from the plurality of first sensors 480.

Also, the processor 430 can measure the outdoor temperature, the outdoor humidity, and the level of outdoor air cleanliness, based on second sensing information (SI2) received from at least one out of the plurality of second sensors 490.

According to an embodiment of the present disclosure, a standard air condition indicates a user's optimal air condition. For example, the standard air condition can be set to a temperature of 27 degrees, a humidity of 50%, and the level of air cleanliness indicating good. The processor 430 can control the air condition of the first area (indoor area) to be the standard air condition.

For example, when the outdoor temperature is 31 degrees, the outdoor humidity is 90%, and the level of air cleanliness is normal, the processor 430 can operate an air conditioner in a medium wind mode, operate an air cleaner, and operate a humidifier in a strong mode. That is, the processor 430 can control the air condition of the indoor area based on the air condition of the outdoor area.

Also, when the outdoor temperature is 29 degrees, the outdoor humidity is 50% and the level of air cleanliness is good, the processor 430 can open a smart door, thereby controlling the air condition of the indoor area through ventilation.

Each of the components of the electronic device according to the present disclosure can be implemented by one or more components and the name of the corresponding component can vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a communication module; and
   a processor configured to:
      receive, using the communication module, first sensing information from at least one first sensor located in an indoor area, wherein the first sensing information includes information on an air condition of the indoor area;
      receive, using the communication module, second sensing information from at least one second sensor among a plurality of sensors located in an outdoor area, wherein the second sensing information includes information on an air condition of the outdoor area;
      identify the air condition of the indoor area and the air condition of the outdoor area, based on the first sensing information and the second sensing information; and
      transmit, using the communication module, a control signal to control at least one air control device located in the indoor area for managing the air condition of the indoor area, based on the air condition of the indoor area and the air condition of the outdoor area, wherein the at least one second sensor is selected based on a location of the electronic device, wherein when the at least one air control device includes a smart door and an air conditioner, the processor determines whether to open or close the smart door, and whether to activate or deactivate the air conditioner, based on the first sensing information and the second sensing information, and wherein the processor is further configured to identify the air condition of the indoor area using a reference air condition determined based on an usage pattern of the at least one air control device.

2. The electronic device of claim 1, further comprising:
a memory configured to store location information of the plurality of sensors located in the outdoor area.

3. The electronic device of claim 2, wherein the processor is configured to:
compare the location information and the location of the electronic device, and
select the at least one second sensor that is closest to the electronic device among the plurality of sensors.

4. The electronic device of claim 1, wherein the processor is further configured to:
analyze a usage pattern of the at least one air control device, and
determine a standard air condition based on the analyzed usage pattern.

5. The electronic device of claim 4, wherein the usage pattern of the at least one air control device includes at least one of a type of the at least one air control device, a time when the at least one air control device is used, a condition where the at least one air control device is used, or a place where the at least one air control device is used.

6. The electronic device of claim 1, wherein the processor is configured to:
obtain location information of each of the at least one first sensor based on a strength of the first sensing information that is received from the at least one first sensor, and
control the air control device based on the location information of the at least one first sensor.

7. The electronic device of claim 1, wherein the processor is configured to:
provide information associated with the air condition of the indoor area and the air condition of the outdoor area, based on the first sensing information and the second sensing information.

8. The electronic device of claim 1, wherein the air control device includes at least one of an air conditioner, an air-washer, a heater, an air cleaner, a humidifier, or a smart door.

9. A method of operating an electronic device, the method comprising:
receiving first sensing information from at least one first sensor located in an indoor area, wherein the first sensing information includes information on an air condition of the indoor area;
receiving second sensing information from at least one second sensor among a plurality of sensors located in an outdoor area, wherein the second sensing information includes information on an air condition of the outdoor area;

identifying the air condition of the indoor area and the air condition of the outdoor area, based on the first sensing information and the second sensing information; and
transmitting a control signal to control at least one air control device located in the indoor area for managing the air condition of the indoor area, based on the air condition of the indoor area and the air condition of the outdoor area, wherein the at least one second sensor is selected based on a location of the electronic device, wherein when the at least one air control device includes a smart door and an air conditioner, the identifying the air condition further comprises determining whether to open or close the smart door, and whether to activate or deactivate the air conditioner, based on the first sensing information and the second sensing information, wherein the identifying the air condition of the indoor area includes identifying the air condition of the indoor area using a reference air condition determined based on an usage pattern of the at least one air control device.

10. The method of claim 9, wherein the receiving of the second sensing information comprises:
comparing location information of the plurality of sensors and the location of the electronic device; and
selecting, at least one second sensor that is closest to the electronic device among the plurality of sensors.

11. The method of claim 9, wherein the transmitting a control signal comprises:
searching for at least one air control device existing around the electronic device; and
transmitting the control signal to the at least one air control device so as to control the air condition in the indoor area.

12. The method of claim 11, further comprising:
analyzing a usage pattern of the at least one air control device, and
determining a standard air condition based on the analyzed usage pattern.

13. The method of claim 12, wherein the usage pattern of the at least one air control device includes at least one of: a type of the at least one air control device, a time when the at least one air control device is used, a condition where the at least one air control device is used, or a place where the at least one air control device is used.

14. The method of claim 9, wherein the transmitting a control signal comprises:
obtaining location information of the at least one first sensor based on a strength of the first sensing information that is received from the at least one first sensor; and
controlling the at least one air control device based on the location information of the first sensor.

15. The method of claim 9, further comprising:
providing information associated with the air condition of the indoor area and the air condition of the outdoor area, based on the first sensing information and the second sensing information.

* * * * *